United States Patent
Shibahara et al.

(10) Patent No.: US 11,212,297 B2
(45) Date of Patent: Dec. 28, 2021

(54) ACCESS CLASSIFICATION DEVICE, ACCESS CLASSIFICATION METHOD, AND RECORDING MEDIUM

(71) Applicant: NIPPON TELEGRAPH AND TELEPHONE CORPORATION, Chiyoda-ku (JP)

(72) Inventors: Toshiki Shibahara, Musashino (JP); Takeshi Yagi, Musashino (JP); Mitsuaki Akiyama, Musashino (JP); Yuta Takata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 176 days.

(21) Appl. No.: 16/307,358

(22) PCT Filed: May 15, 2017

(86) PCT No.: PCT/JP2017/018213
§ 371 (c)(1),
(2) Date: Dec. 5, 2018

(87) PCT Pub. No.: WO2017/217163
PCT Pub. Date: Dec. 21, 2017

(65) Prior Publication Data
US 2019/0297092 A1 Sep. 26, 2019

(30) Foreign Application Priority Data
Jun. 17, 2016 (JP) .............................. JP2016-120656

(51) Int. Cl.
*H04L 29/06* (2006.01)
*G06F 16/00* (2019.01)
(Continued)

(52) U.S. Cl.
CPC .............. *H04L 63/14* (2013.01); *G06F 16/00* (2019.01); *G06F 21/56* (2013.01); *G06N 5/003* (2013.01);
(Continued)

(58) Field of Classification Search
CPC ... H04L 63/14; H04L 63/104; H04L 63/1416; H04L 63/145; H04L 63/168; G06F 21/56; G06N 5/003
(Continued)

(56) References Cited

U.S. PATENT DOCUMENTS 7,352,739 B1 * 4/2008 Rangarajan ............. H04L 45/00
370/378
9,087,142 B2 * 7/2015 Barkol .................. G06F 16/185
(Continued)

FOREIGN PATENT DOCUMENTS

JP 2013-257773 A 12/2013
JP 2016-57767 A 4/2016

OTHER PUBLICATIONS

International Search Report dated Jul. 4, 2017 in PCT/JP2017/018213 filed May 15, 2017.
(Continued)

*Primary Examiner* — Dant B Shaifer Harriman
(74) *Attorney, Agent, or Firm* — Oblon, McClelland, Maier & Neustadt, L.L.P.

(57) ABSTRACT

An access classification device includes: a processor configured to: construct a plurality of trees in each of which at least a first destination and a second destination are set as nodes, content information corresponding to the nodes is added to the nodes, and an instruction to transfer an access from the first destination to the second destination is set as an edge; associate nodes of the plurality of trees with each other for the plurality of trees constructed, based on simi-
(Continued)

larity between local structures of the trees; calculate similarity between the nodes associated with each other in the plurality of trees, based on the content information added to the nodes, and calculate similarity between the plurality of trees using the calculated similarity between the nodes associated with each other; and classify the access into a set with similar features, based on the similarity calculated.

7 Claims, 17 Drawing Sheets

(51) Int. Cl.
  *G06N 5/00* (2006.01)
  *G06N 20/20* (2019.01)
  *G06F 21/56* (2013.01)
  *G06N 20/10* (2019.01)
(52) U.S. Cl.
  CPC ........... *G06N 20/20* (2019.01); *H04L 63/104* (2013.01); *H04L 63/145* (2013.01); *H04L 63/1416* (2013.01); *H04L 63/168* (2013.01); *G06F 2221/2119* (2013.01); *G06N 20/10* (2019.01)
(58) Field of Classification Search
  USPC .......................................................... 726/23
  See application file for complete search history.

(56) References Cited

U.S. PATENT DOCUMENTS

| | | | |
|---|---|---|---|
| 9,356,941 B1 | 5/2016 | Kislyuk et al. | |
| 9,672,234 B2* | 6/2017 | Berger | G06F 16/2246 |
| 10,148,571 B2* | 12/2018 | Kfir | H04L 45/48 |
| 10,255,323 B1* | 4/2019 | Guo | G06F 16/2237 |
| 2003/0130977 A1* | 7/2003 | Oommen | G06K 9/6892 |
| | | | 706/59 |
| 2009/0077076 A1* | 3/2009 | Berger | G06F 16/2246 |
| 2009/0323109 A1* | 12/2009 | Mori | G06F 3/1285 |
| | | | 358/1.15 |
| 2010/0262693 A1 | 10/2010 | Stokes et al. | |
| 2015/0020199 A1 | 1/2015 | Neil et al. | |
| 2015/0092609 A1* | 4/2015 | Shah | H04L 45/48 |
| | | | 370/256 |
| 2016/0021126 A1* | 1/2016 | Vasseur | H04L 63/1458 |
| | | | 726/23 |
| 2016/0094572 A1* | 3/2016 | Tyagi | G06F 8/427 |
| | | | 726/23 |
| 2016/0337387 A1* | 11/2016 | Hu | G06F 16/2246 |
| 2017/0366459 A1* | 12/2017 | Kfir | H04L 45/748 |

OTHER PUBLICATIONS

Toshiki Shibahara, et al., "Detecting Malicious Web Pages based on Structural Similarity of Redirection Chains," Computer Security Symposium 2015, vol. 2015, No. 3, Oct. 2015, 9 Pages.
Peter Likarish, et al., "Obfuscated Malicious Javascript Detection using Classification Techniques," 4th International Conference on Malicious and Unwanted Software (MALWARE), 2009, pp. 47-54.
Charlie Curtsinger, et al., "ZOZZLE: Fast and Precise In-Browser JavaScript Malware Detection," USENIX Security Symposium, 2011, 16 Pages.
Alexandros Kapravelos, et al., "Revolver: An Automated Approach to the Detection of Evasive Web-based Malware," 22nd USENIX Security Symposium, Aug. 2013, 16 Pages.
Christian Seifert, et al., "Identification of Malicious Web Pages with Static Heuristics," IEEE Telecommunication Networks and Applications Conference, 2008, pp. 91-96.
Justin Ma, et al., "Beyond Blacklists: Learning to Detect Malicious Web Sites from Suspicious URLs," Proceedings of the 15th ACM SIGKDD International Conference on Knowledge Discovery and Data Mining, 2009, pp. 1245-1253.
Davide Canali, et al., "Prophiler: A Fast Filter for the Large-Scale Detection of Malicious Web Pages," Proceedings of the 20th International Conference on World Wide Web, 2011, pp. 197-206.
Kevin Borgolte, et al., "Delta: Automatic Identification of Unknown Web-based Infection Campaigns," Proceedings of the 2013 ACM SIGSAC Conference on Computer & Communications Security, Nov. 2013, pp. 109-120.
Takashi Matsunaka, et al., "An Approach to Detect Drive-by Download by Observing the Web Page Transition Behaviors," 2014 Ninth Asia Joint Conference on Information Security, 2014, pp. 19-25.
Gianluca Stringhini, et al., "Shady Paths: Leveraging Surfing Crowds to Detect Malicious Web Pages," Proceedings of the 2013 ACM SIGSAC Conference on Computer & Communications Security, Nov. 2013, 12 Pages.
M. Zubair Rafique, et al., "Network Dialog Minimization and Network Dialog Diffing: Two Novel Primitives for Network Security Applications," Proceedings of the 30th Annual Computer Security Applications Conference, Dec. 2014, 10 Pages.
Extended European Search Report dated Oct. 25, 2019 in European Patent Application No. 17813066.2 citing documents AA-AC therein, 6 pages.

\* cited by examiner

FIG.2A

| SERIAL NUMBER | TRANSFER DESTINATION | TRANSFER SOURCE | TRANSFER INSTRUCTION |
|---|---|---|---|
| 1 | http://foo1.example.com/index.html | http://foo.example.com/index.html | SRC-IFRAME |
| 1 | http://foo.example.com/1.js | http://foo.example.com/index.html | SRC-SCRIPT-SRC |
| 1 | http://foo1.example.com/2.jar | http://foo1.example.com/index.html | SRC-APPLET-ARCHIVE |
| 2 | http://foo.example3.com/index.php | http://foo.example2.com/index.html | HTTP302Redirect |
| 2 | http://foo.example3.com/3.js | http://foo.example3.com/index.php | SRC-SCRIPT-SRC |
| 2 | http://foo.example3.com/abc/4.html | http://foo.example3.com/index.php | SRC-OBJECT-CODEBASE |
| ⋮ | ⋮ | ⋮ | ⋮ |

FIG.2B

| SERIAL NUMBER | DESTINATION | CONTENT |
|---|---|---|
| 1 | http://foo.example.com/index.html | HTML |
| 1 | http://foo1.example.com/index.html | HTML |
| 1 | http://foo.example.com/1.js | JavaScript |
| 1 | http://foo1.example.com/2.jar | jar |
| | ⋮ | ⋮ |

FIG.3A

| SERIAL NUM-BER | LABEL | TRANSFER DESTINATION | TRANSFER SOURCE | TRANSFER INSTRUCTION |
|---|---|---|---|---|
| 1 | BENIGN | http://www1.example.com/index.html | http://www.example.com/index.html | SRC-IFRAME |
| | | http://www.example.com/1.js | http://www.example.com/index.html | SRC-SCRIPT-SRC |
| | | http://www1.example.com/2.jar | http://www1.example.com/index.html | SRC-APPLET-ARCHIVE |
| 2 | MALI-CIOUS | http://www.example3.com/index.php | http://www.example2.com/index.html | HTTP302Redirect |
| | | http://www.example3.com/3.js | http://www.example3.com/index.php | SRC-SCRIPT-SRC |
| | | http://www.example3.com/abc/4.html | http://www.example3.com/index.php | SRC-OBJECT-CODEBASE |
| ⋮ | ⋮ | ⋮ | ⋮ | ⋮ |

FIG.3B

| SERIAL NUMBER | DESTINATION | CONTENT |
|---|---|---|
| 1 | http://www.example.com/index.html | HTML |
| | http://www1.example.com/index.html | HTML |
| | http://www.example.com/1.js | JavaScript |
| | http://www1.example.com/2.jar | jar |
| ⋮ | ⋮ | ⋮ |

FIG.5
(a)
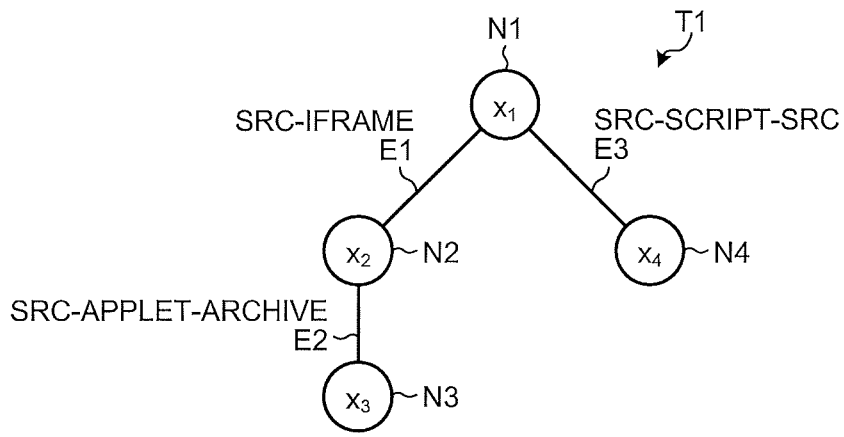
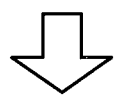
(b)
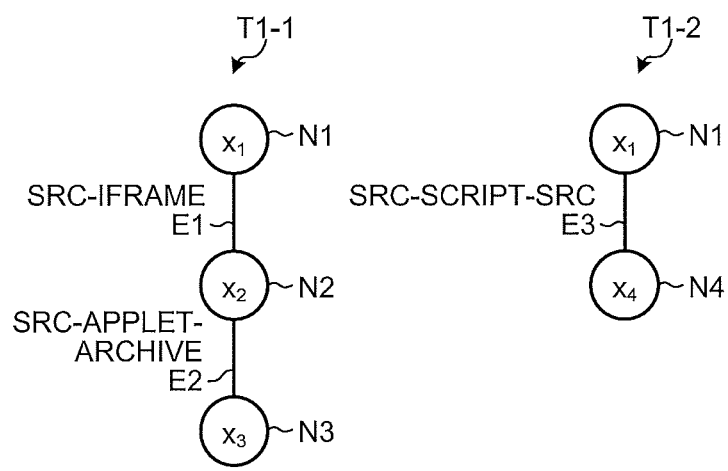
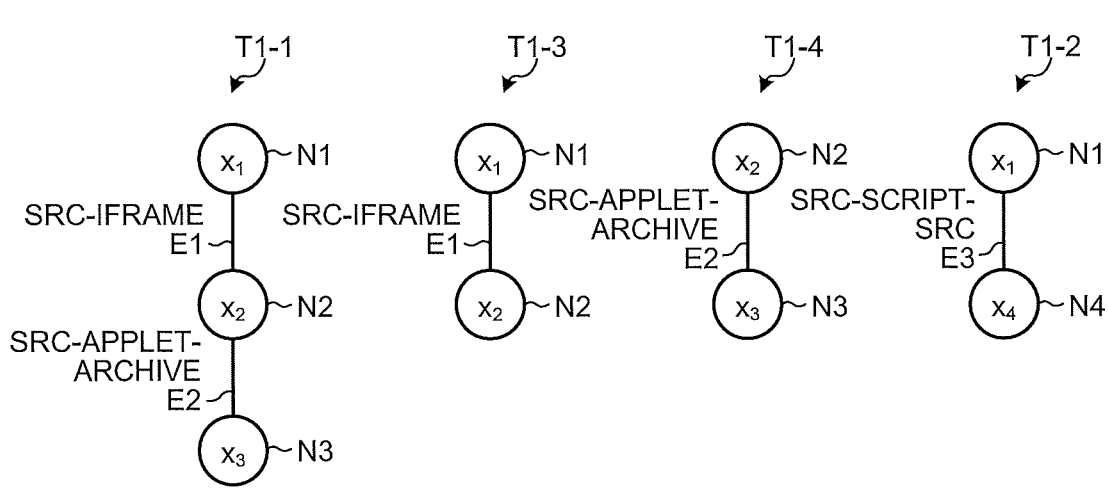
(c)

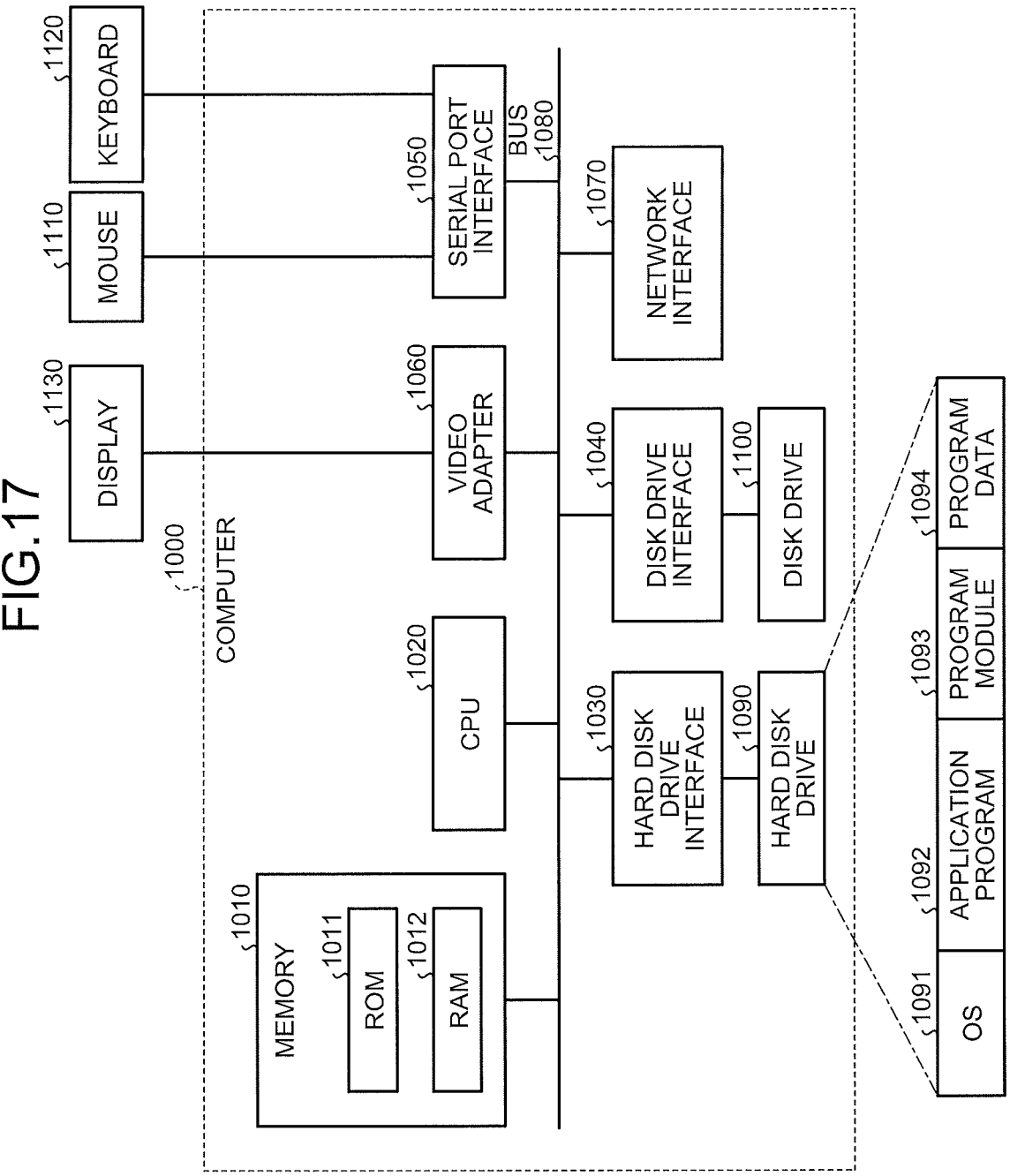

ACCESS CLASSIFICATION DEVICE, ACCESS CLASSIFICATION METHOD, AND RECORDING MEDIUM

TECHNICAL FIELD

The present invention relates to an access classification device, an access classification method, and a recording medium.

BACKGROUND ART

There have been malicious website identification methods, which are methods of identifying malicious websites that transmit malware, from among websites accessed by user terminals. Such malicious website identification methods are classified into a method based on behavior on a host and a method based on features of content.

The method based on behavior on a host is a method of identifying a malicious website by executing content such as HTML (HyperText Markup Language) or JavaScript (registered trademark) obtained from a server such as a web server, and detecting attack on vulnerability from behavior on a host at that time.

On the other hand, the method based on features of content is a method of identifying a malicious website by obtaining content from a server, performing code analysis on the content, and applying machine learning based on features such as a function and a character string characteristically appearing in malicious code, information on a domain and a URL (Uniform Resource Locator), and redirection (transfer) information.

Hereinafter, conventional techniques related to malicious website identification using the method based on features of content will be described. Malicious website identification methods using the method based on features of content include a method for identification by using features of content obtained from a single page, and a method for identification by extracting features from accesses to a plurality of pages caused by redirection of a website.

In the former identification method, many methods for identification by analyzing JavaScript in content have been proposed. Among these methods, for example, there is a method for identification by writing a feature vector using the number of lines and the number of characters in a script and the number of occurrences of a keyword in the script, and using a machine learning method (Non Patent Document 1). There is also a method for identification by extracting processing in a for statement and a while statement, and creating a feature vector (Non Patent Document 2). Further, there is a method of creating a series composed of node types of an abstract syntax tree created from JavaScript, for identification based on similarity of the series (Non Patent Document 3), for example.

Other than JavaScript, there are also methods using HTML, URL, and host information. For example, methods using HTML include a method for identification by extracting the number of occurrences of an iframe or a script tag and the size feature quantity of the tag (Non Patent Document 4). Methods using URL and host information include a method of performing malignancy determination on an URL, using a keyword included in the URL, a result of DNS (Domain Name System) inquiry, and geographical information associated with an IP (Internet Protocol) address (Non Patent Document 5).

There is also a method of constructing a plurality of classifiers for performing malignancy determination from pieces of information of JavaScript, HTML, URL, and a host, and performing malignancy determination on a website based on all determinations by the classifiers (Non Patent Document 6). Also, a method of extracting difference from content obtained when accessing the same page at different times, and performing malignancy determination based on the difference has been proposed (Non Patent Document 7).

In addition to the above, in a method of performing identification based on a plurality of accesses to a website caused by transfer, a feature quantity is extracted from various viewpoints to identify a malicious website. For example, in a method by Matsunaka et al. (Non Patent Document 8), transfer caused by attack on vulnerability is detected, based on the fact that an HTTP (HyperText Transfer Protocol) header at the time of downloading an executed file, or content obtained before download does not include information indicating download.

In a method by Stringhini et al. (Non Patent Document 9), from the time series of a series of pages accessed by each user by automatic transfer, access groups with the same final page is created, and then a feature vector including the number of IP addresses and the number of redirections is created from the access groups, for identification of malicious websites. Furthermore, a method by Rafique et al. (Non Patent Document 10) identifies malicious websites by extracting a part essential for downloading malware from a series of pages accessed by redirection, by accessing a plurality of pages in the series, individually, and creating a signature.

CITATION LIST

Non Patent Citation

Non Patent Document 1: Peter Likarish, Eunjin Jung, and Insoon Jo, "Obfuscated Malicious Javascript Detection using Classification Techniques.", IEEE 4th International Conference on Malicious and Unwanted Software (MALWARE), 2009.

Non Patent Document 2: Charlie Curtsinger, et al., "ZOZZLE: Fast and Precise In-Browser JavaScript Malware Detection.", USENIX Security Symposium, 2011.

Non Patent Document 3: Alexandros Kapravelos, et al., "Revolver: An Automated Approach to the Detection of Evasive Web-based Malware.", USENIX Security, 2013.

Non Patent Document 4: Christian Seifert, Ian Welch, and Peter Komisarczuk, "Identification of Malicious Web Pages with Static Heuristics.", IEEE Telecommunication Networks and Applications Conference, 2008.

Non Patent Document 5: Justin Ma, et al., "Beyond Blacklists: Learning to Detect Malicious websites from Suspicious URLs.", Proceedings of the 15th ACM SIGKDD international conference on Knowledge discovery and data mining, 2009.

Non Patent Document 6: Davide Canali, et al., "Prophiler: A Fast Filter for the Large-Scale Detection of Malicious Web Pages.", Proceedings of the 20th international conference on World wide web, 2011.

Non Patent Document 7: Kevin Borgolte, Christopher Kruegel, and Giovanni Vigna, "Delta: Automatic Identification of Unknown Web-based Infection Campaigns." Proceedings of the 2013 ACM SIGSAC conference on Computer & communications security, 2013.

Non Patent Document 8: Takashi Matsunaka, Ayumu Kubota, and Takahiro Kasama, "An Approach to Detect Drive-by Download by Observing the Web Page Transition Behaviors.", Ninth Asia Joint Conference on Information Security, 2014.

Non Patent Document 9: Gianluca Stringhini, Christopher Kruegel, and Giovanni Vigna, "Shady Paths: Leveraging Surfing Crowds to Detect Malicious Web Pages.", Proceedings of the 2013 ACM SIGSAC conference on Computer & communications security, 2013.

Non Patent Document 10: M. Zubair Rafique, et al., "Network Dialog Minimization and Network Dialog Diffing: Two Novel Primitives for Network Security Applications.", Proceedings of the 30th Annual Computer Security Applications Conference, 2014.

SUMMARY OF INVENTION

Technical Problem

In order to reduce damage caused by malicious websites, it is important to comprehensively collect information on malicious websites. On the other hand, in order to prevent malicious websites from being detected, attackers are implementing workarounds to detect accesses by analysis systems to hide attack code. For this reason, in order to reduce damage, it is important to detect such malicious pages as well. However, the conventional methods have a problem that they cannot detect malicious websites from which attack code cannot be obtained due to concealment by attackers or the like, or have low detection accuracy.

For example, the method based on features of content has a problem that it cannot detect that a malicious website from which attack code cannot be obtained is malicious because malicious content cannot be obtained from pages, the feature quantity is almost zero, and the malicious website is determined to be benign.

Methods focusing on the relationships between a plurality of pages can be roughly divided into a method focusing on redirection to attack code and a method focusing on the form of a graph formed based on redirection. Of the methods focusing on the relationships between a plurality of pages, the method focusing on redirection to attack code has a problem that a malicious website from which attack code cannot be obtained cannot be detected because redirection focused on does not occur unless attack code is obtained.

On the other hand, of the methods focusing on the relationships between a plurality of pages, the method focusing on the form of a redirection graph has a problem that distinguishing from graph forms of benign sites is difficult when attack code cannot be obtained, and detection accuracy for malicious websites is low. Generally, the form of a redirection graph is based on the number of stages of redirection or the like. The number of stages tends to be long in redirection of a malicious website, and the number of stages tends to be short in redirection of a benign site. From this fact, in the method focusing on the form of a redirection graph, when attack code cannot be obtained, even a malicious website is short in the number of redirection stages, and the graph form is close to that of a benign site, and thus it is difficult to detect that it is a malicious website. As a result, there is a problem that the malicious website cannot be entered in a black list, and users are allowed to access the malicious website.

As described above, the conventional techniques have a problem that they cannot detect malicious websites from which attack code cannot be obtained due concealment of attackers or the like, or detection accuracy is low.

The present invention has been made in view of the above. It is an object of the present invention to provide an access classification device, an access classification method, and an access classification program that can accurately detect a malicious website from which attack code cannot be obtained.

Solution to Problem

To solve the above problem and attain the object, an access classification device according to the present invention includes: a processor configured to: construct a plurality of trees in each of which at least a first destination and a second destination are set as nodes, content information corresponding to the nodes is added to the nodes, and an instruction to transfer an access from the first destination to the second destination is set as an edge; associate nodes of the plurality of trees with each other for the plurality of trees constructed, based on similarity between local structures of the trees; calculate similarity between the nodes associated with each other in the plurality of trees, based on the content information added to the nodes, and calculate similarity between the plurality of trees using the calculated similarity between the nodes associated with each other; and classify the access into a set with similar features, based on the similarity calculated.

Advantageous Effects of Invention

According to the present invention, it is possible to accurately detect malicious websites from which attack code cannot be obtained.

BRIEF DESCRIPTION OF DRAWINGS

FIG. 2A is a diagram illustrating an example of accesses to be analyzed that are input to the access classification device illustrated in FIG. 1.

FIG. 2B is a diagram illustrating an example of accesses to be analyzed that are input to the access classification device illustrated in FIG. 1.

FIG. 3A is a diagram illustrating an example of known accesses input to the access classification device illustrated in FIG. 1.

FIG. 3B is a diagram illustrating an example of known accesses input to the access classification device illustrated in FIG. 1.

FIG. 5 is a diagram illustrating a process in which subtrees are extracted from a tree.

FIG. 17 is a diagram illustrating an example of a computer on which an access classification device is implemented by a program being executed.

EMBODIMENTS FOR CARRYING OUT THE INVENTION

Figure 1:
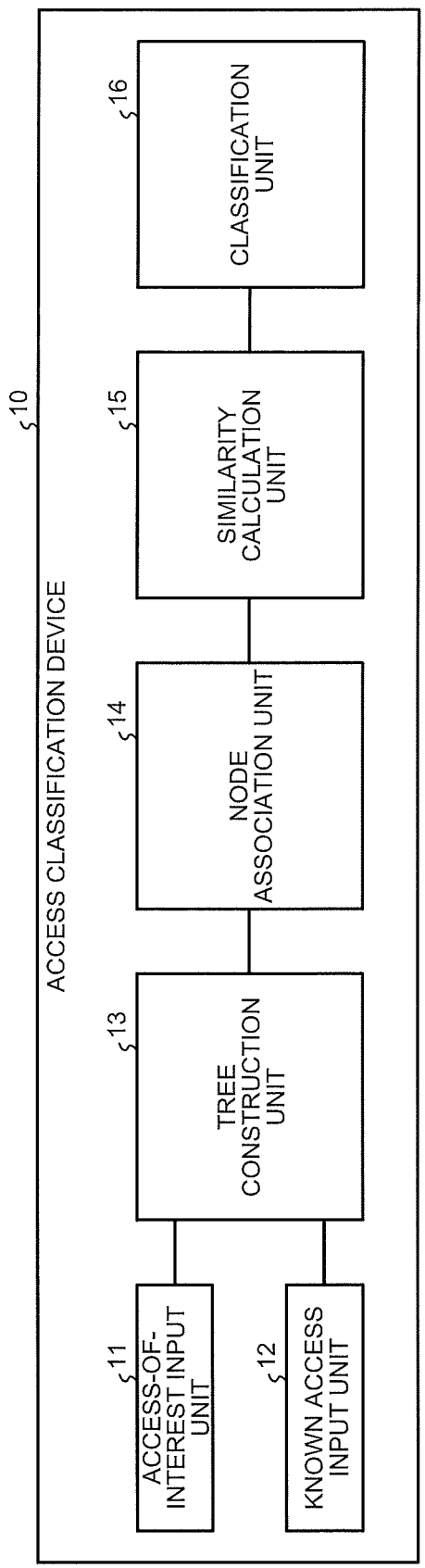
FIG. 1 is a schematic diagram illustrating a schematic configuration of an access classification device according to a first embodiment.

Hereinafter, an embodiment of the present invention will be described in detail with reference to the drawings. Note that the present invention is not limited by this embodiment. Further, in the description of the drawings, the same reference numerals are assigned to the same parts to denote them.

First Embodiment

First, an access classification device according to a first embodiment will be described in terms of a schematic configuration, a flow of access classification processing, and specific examples.

FIG. 1 is a schematic diagram illustrating a schematic configuration of the access classification device according to the first embodiment. As illustrated in FIG. 1, an access classification device 10 according to the first embodiment includes an access-of-interest input unit 11, a known access input unit 12, a tree construction unit 13, a node association unit 14, a similarity calculation unit 15, and a classification unit 16. These constituent parts are connected in one direction or bidirectionally so that various signals and data can be input and output.

The access-of-interest input unit 11 accepts an access to destinations to be analyzed as input. As an access to destinations to be analyzed, the access-of-interest input unit 11 accepts information on redirection and information on content as input.

The known access input unit 12 accepts as input a known malicious access that is known to be an access to destinations providing a malicious website, and on the other hand, a known benign access that is known to be an access to destinations providing a benign website. The known access input unit 12 accepts, as a known access, information on redirection and information on content as input.

From each access input by the access-of-interest input unit 11 and the known access input unit 12, the tree construction unit 13 constructs a tree with at least an access source (automatic transfer source) to a destination to be analyzed (first destination) and a destination of an access destination (automatic transfer destination) (second destination) as "nodes," and with an automatic transfer instruction as an "edge." In addition, the tree construction unit 13 adds content information on each node to the node.

For a plurality of trees created by the tree construction unit 13, the node association unit 14 determines correspondence between nodes constituting the plurality of trees. The node association unit 14 associates nodes of a plurality of trees with each other, based on similarity between local structures of the plurality of trees.

The similarity calculation unit 15 calculates similarity between the nodes associated with each other between the plurality of trees, based on the content information added to these nodes, and calculates similarity between the plurality of trees, using the calculated similarity between the nodes associated with each other.

Based on the similarity calculated by the similarity calculation unit 15, the classification unit 16 classifies the access into a set with similar features. For example, using the similarity calculated by the similarity calculation unit 15, the classification unit 16 determines whether or not the access input by the access-of-interest input unit 11 is an access to a malicious website.

[Example of Access to be Analyzed]

FIGS. 2A and 2B are diagrams illustrating an example of accesses to be analyzed that are input to the access classification device 10. As illustrated in FIGS. 2A and 2B, accesses to be analyzed are information on redirection (see FIG. 2A) and information on content (see FIG. 2B).

First, with reference to FIG. 2A, information on redirection will be described. As illustrated in FIG. 2A, information on redirection includes information of a serial number, a transfer destination, a transfer source, and a transfer instruction. Note that not only redirection of HTTP status code 300$s$, but also automatic transfer caused by the obtainment of content designated by an HTML tag are called redirection.

As a serial number, as illustrated in FIG. 2A, the same number is assigned to redirections included in the same series of accesses. Transfer destinations and transfer sources include URLs, but are not limited to them, and may be FQDN (Fully Qualified Domain Names), domains, host names, IP addresses, etc. Alternatively, without specifying a destination, the destination may be replaced with another character string or the like. However, in this case, it is necessary that the character string and the destination correspond one to one.

Transfer instructions include "SRC-IFRAME" representing a link by an iframe tag of an HTML tag, "SRC-SCRIPT-SRC" representing a link by a Script tag of an HTML tag, and the like, but are not limited to them. For example, transfer instructions may be "SRC-APPLET-ARCHIVE" representing a link by an Applet tag of an HTML tag, "HTTP302Redirect" representing a transfer by HTTP, "SRC-OBJECT-CODEBASE" representing a link by an Object tag of an HTML tag, and the like. Further, without specifying a transfer instruction, the transfer instruction may be replaced with another character string or the like. In this case, however, it is necessary that the character string and the transfer instruction correspond one to one.

Further, information on redirection is not limited to the example illustrated in FIG. 2A, and may include the time when a transfer has occurred or the like. This is because, when it is assumed that the time when a redirection has occurred and the time when content has been obtained are used in combination, the time between an access to a URL and the occurrence of the redirection can be measured from them. Here, since it is known that malicious JavaScript is obfuscated and thus takes time to process, it is possible to consider the time required to process. Note that whether to include that in the information on redirection can be considered in terms of whether the tendency differs between benign websites and malicious websites.

Next, with reference to FIG. 2B, information on content will be described. As illustrated in FIG. 2B, information on content includes information of a serial number, a destination, and content.

As illustrated in FIG. 2B, for a serial number, the same one as that of the information on redirection illustrated in FIG. 2A is used. However, if content obtained from the same destination by different accesses is the same, a serial number may not be provided. As illustrated in FIG. 2B, destinations include URLs, but are not limited to them. Like the information on redirection, destinations may include FQDNs (Fully Qualified Domain Names), domains, host names, IP addresses, etc.

Also, as illustrated in FIG. 2B, content includes HTML and JavaScript, but is not limited to them. Content may be PHP (Hypertext Preprocessor), CSS (Cascading Style Sheets), an image, or the like. In addition, information on content is not limited to the example illustrated in FIG. 2B, and may include information such as the time when content has been obtained and the time taken to obtain the content. As with the information on redirection, this is because, when it is assumed that the time when a redirection has occurred and the time when content has been obtained are used in combination, the time between an access to a URL and the occurrence of the redirection can be measured from them.

[Example of Known Access]

FIGS. 3A and 3B are diagrams illustrating an example of known accesses input to the access classification device 10. As illustrated in FIGS. 3A and 3B, known accesses are information on redirection (see FIG. 3A) and information on content (see FIG. 3B).

As illustrated in FIG. 3A, information on a redirection includes a serial number, a label, a transfer destination, a transfer source, and a transfer instruction. As illustrated in FIG. 3A, for serial numbers, the same number is assigned to redirections included in the same series of accesses, as in the example of FIG. 2A. As illustrated in FIG. 3A, a transfer destination or a transfer source may be a URL as in the example of FIG. 2A, but, of course, is not limited to this. Alternatively, without specifying a destination, the destination may be replaced with another character string or the like. However, it is necessary that the character string and the destination correspond one to one.

Further, as illustrated in FIG. 3A, a transfer instruction may be "SRC-IFRAME," "SRC-SCRIPT-SRC," or the like as in the example of FIG. 2A, but is not limited to this. Further, a transfer instruction may be replaced with a character string or the like. In this case, it is necessary to replace it by the same method as that for an access of interest.

Also, as illustrated in FIG. 3A, a label identifying the property of a communication destination is assigned to each access. This label is not limited to "benign" or "malicious" illustrated in FIG. 3A, and may be "advertisement," "Drive-by-Download," "Phishing," or the like. Note that information on redirection is not limited to the example illustrated in FIG. 3A.

As illustrated in FIG. 3B, information on content includes information of a serial number, a destination, and content. As illustrated in FIG. 3B, for serial numbers, the same ones as those of the information on redirection illustrated in FIG. 3A are used. However, if content obtained from the same destination by different accesses is the same, a serial number may not be provided. As illustrated in FIG. 3B, a destination may be a URL, but is not limited to this.

Content includes HTML and JavaScript, but is not limited to them. Note that the following description is provided on the assumption that the information on content relates to content among the input from the known access input unit 12, the content is code of HTML and JavaScript, or the like, and the content information is the content numerically expressed. In addition, the information on content is not limited to the example illustrated in FIG. 3B.

[Tree Construction]

Figure 4:
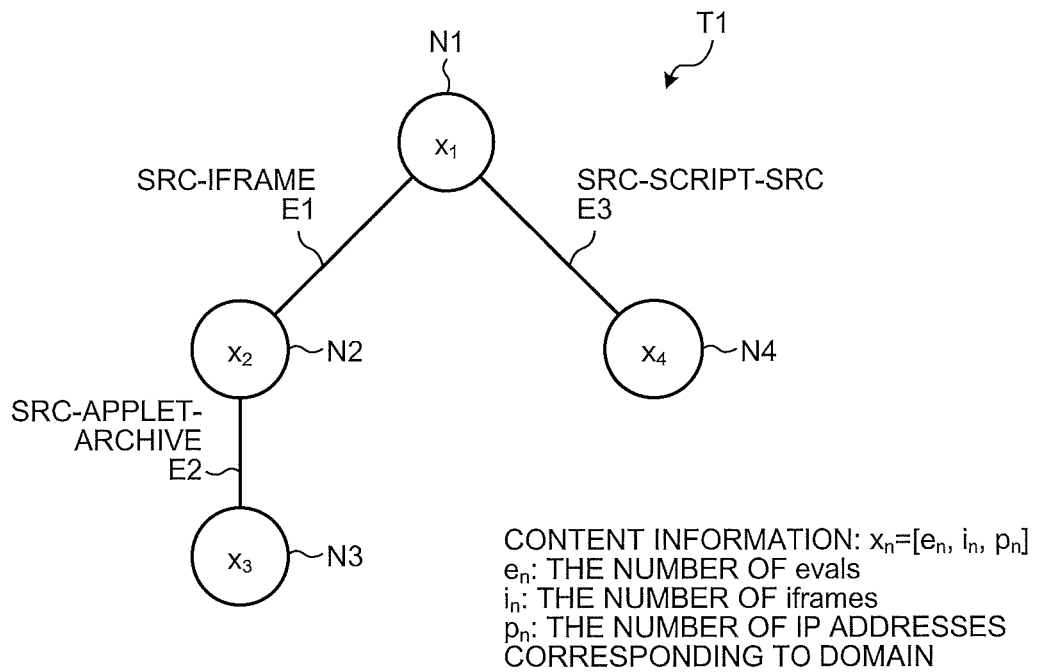
FIG. 4 is a diagram illustrating tree construction processing performed by a tree construction unit illustrated in FIG. 1.

Next, tree construction by the tree construction unit 13 illustrated in FIG. 1 will be described. FIG. 4 is a diagram illustrating tree construction processing by the tree construction unit 13. As illustrated in FIG. 4, the tree construction unit 13 constructs a tree T1 with transfer sources and transfer destinations as "nodes" and transfer instructions as "edges," based on the access transfer information illustrated in FIGS. 2 and 3. Then, the tree construction unit 13 adds the content information on each node to the node.

For example, the tree construction unit 13 sets the URLs of websites as nodes N1 to N4, and creates edges E1 to E3 corresponding to the transfer instructions between the URLs between the transfer source URLs and the transfer destination URLs.

Then, the content information on the URLs of the nodes N1 to N4 is added to the nodes N1 to N4. In the first embodiment, as content information, a plurality of pieces of information effective for malignancy determination is numerically expressed from content and a URL corresponding to a node, and is expressed as a vector.

Specifically, as illustrated in FIG. 4, content information $x_n$ corresponding to a node Nn is expressed as $x_n=[e_n, i_n, p_n]$ where the content information is numerically expressed. Here, $e_n$ is the number of evals. $i_n$ is the number of iframes. $p_n$ is the number of IP addresses corresponding to a domain. For example, for the node N1, content information $x_1$ is $x_1=[0, 1, 2]$. Note that in FIGS. 6 to 9 described later, for the sake of explanation, content information $x_n$ of one of two trees illustrated is expressed as $x_n=[e_n, i_n, p_n]$, and content information of the other tree is expressed as $y_m=[e_m, i_m, p_m]$.

Content information is not limited to the number of evals, the number of iframes, and the number of IP addresses corresponding to a domain, and may be the number of occurrences of an HTML tag, the number of occurrences of a JavaScript function, the number of occurrences of a malicious pattern in an URL, etc. All of these may be used as content information, or only part of them may be used. However, it is desirable that content information includes a plurality of categories.

In this way, as content information added to a node, content is numerically expressed, and only malicious content information is extracted therefrom to generate one. As a result, even when meaningless code is added to malicious content, or code not related to attack is deleted, a change in a vector numerically expressed is small. Thus, a malicious website can be detected to make it difficult for an attacker to circumvent it.

When the addition of the content information is completed, the tree construction unit 13 removes the URL information attached to the nodes N1 to N4. This enables website identification focusing on a URL-independent redirection structure.

Note that FIG. 4 illustrates an example in which the URLs once attached to the nodes N1 to N4 are removed, but the URLs may not be removed. Also, as content information, content itself or an URL itself may be used without being numerically expressed, or part of this (a part of code, a domain, or the like) may be extracted for use. In this way, by not numerically expressing part of a URL or the like regularly used on a malicious website, false detection can be reduced.

[Subtree Extraction]

Next, processing of extracting subtrees from a tree constructed by the tree construction unit 13 will be described. FIG. 5 is a diagram illustrating a process in which subtrees are extracted from a tree. As illustrated in FIG. 5, from the constructed tree (see FIG. 4), the tree construction unit 13 extracts subtrees constituting the tree.

For example, as illustrated in FIG. 5(*a*), the tree construction unit 13 extracts, from the tree T1, paths from the node N1 corresponding to the destination accessed first among the series of accesses, to the other end nodes N3 and N4. Next, as illustrated in FIG. 5(*b*), the tree construction unit 13 extracts all partial paths included in the paths (for example, see T1-1 and T1-2). Then, as illustrated in FIG. 5(*c*), the tree construction unit 13 disassembles the extracted partial paths into subtrees T1-1, T1-3, T1-4, and T1-2.

At this time, if there are overlapping subtrees, the tree construction unit 13 desirably deletes one of the overlapping subtrees. Here, when obtainment of a plurality of images from an altered page or the like occurs, overlapping subtrees are extracted. When the number of the subtrees is large, influence of a malicious subtree becomes small when similarity is calculated. Therefore, it is preferable that the tree construction unit 13 deletes overlapping subtrees.

A malicious website redirects a user who has accessed an altered site to attack code, and thus malicious features appear in the path structure. For example, a malicious website causes multilevel redirection to an altered site, a stepping-stone site, a site that identifies a browser version or the like, and a site where attack code is placed. For this reason, as illustrated by example, by extracting subtrees focusing on paths to extract subtrees representing malicious features to reduce the number of subtrees as a whole, the amount of calculation may be reduced. Note that overlapping subtrees are deleted, but the detection processing is possible without deleting them. Also, the subtree extraction method is an example, and is not limiting. Subtrees with a branch may be extracted.

[Node Association Example 1]

Figure 6:
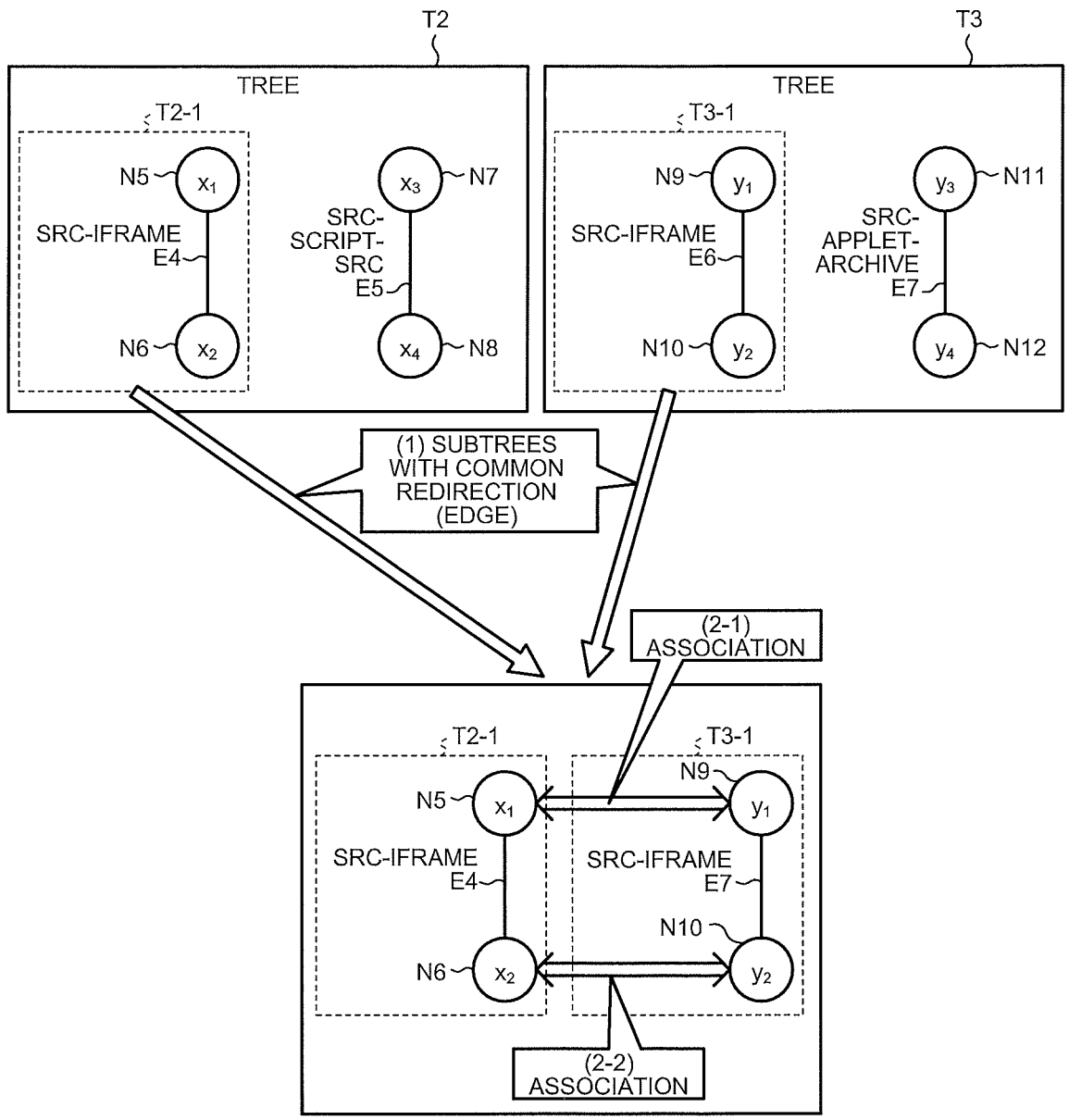
FIG. 6 is a diagram illustrating an example of node association between a plurality of trees.

Next, with reference to FIG. 6, an example of node association between a plurality of trees will be described. FIG. 6 is a diagram illustrating one example of node association between a plurality of trees. The node association unit 14 performs node association based on the subtrees extracted in FIG. 5. For example, when node information is ignored, as illustrated in FIG. 6, the tree construction unit 13 extracts subtrees with edge connections of the subtrees matching. Then, the node association unit 14 identifies a plurality of subtrees with matching edges among subtrees extracted by the tree construction unit 13 for a plurality of trees, and based on correspondence between nodes in the plurality of subtrees identified, determines correspondence between nodes in the plurality of trees.

In the example of FIG. 6, a subtree T2-1 of subtrees of a tree T2 and a subtree T3-1 of a tree T3 match in edge connection. In other words, the subtree T2-1 and the subtree T3-1 are subtrees with a common redirection (see (1) in FIG. 6). Therefore, the node association unit 14 determines correspondence between the nodes in these subtrees T2-1 and T3-1. Note that a subtree having a path from a node N7 to a node N8 of the subtrees of the tree T2, and a subtree having a path from a node N11 to a node N12 of the tree T3 do not match in redirection, so that the node association unit 14 does not perform node association for the two subtrees.

Specifically, the node association unit 14 associates a node N5 corresponding to the transfer source of the subtree T2-1 with a node N9 corresponding to the transfer source of the subtree T3-1 (see (2-1) in FIG. 6). Further, the node association unit 14 associates a node N6 corresponding to the transfer destination of the subtree T2-1 with a node N10 corresponding to the transfer destination of the subtree T3-1 (see (2-2) in FIG. 6).

Note that the node association method described in FIG. 6 is an example, and the present invention is not limited to this. For example, the node association unit 14 may extract subtrees with the number of matches between edges equal to or larger than a threshold, instead of subtrees with matching edges.

[Node Association Example 2]

Alternatively, for a plurality of trees, the node association unit 14 may associate a combination of nodes having a high degree of matching between edges connected to the nodes. In this case, for each combination of nodes in two trees, the node association unit 14 calculates the cost in which the degree of matching in redirection between the nodes is numerically expressed, and associates a combination of nodes having the smallest cost with each other.

For example, the node association unit 14 defines the cost when nodes are associated with each other as the sum of the number of edges of different redirections in which the nodes of interest are the redirection destinations, and the number of edges of different redirections in which the nodes of interest are the redirection sources. Then, the node association unit 14 associates a combination of nodes having the smallest cost among the costs of combinations of nodes in possible combinations of nodes.

Figure 7:
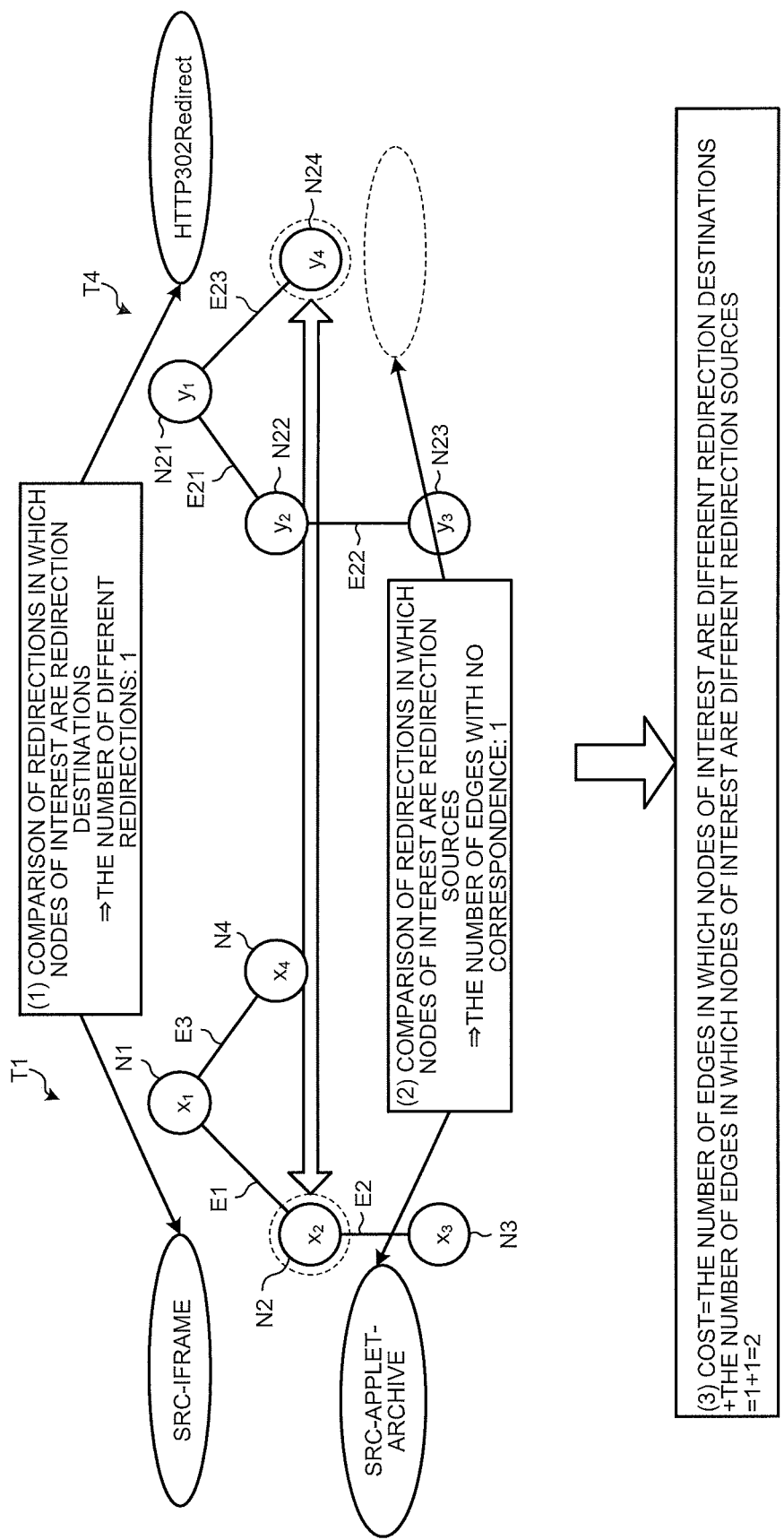
FIG. 7 is a diagram illustrating another example of node association between a plurality of trees.
Figure 8:
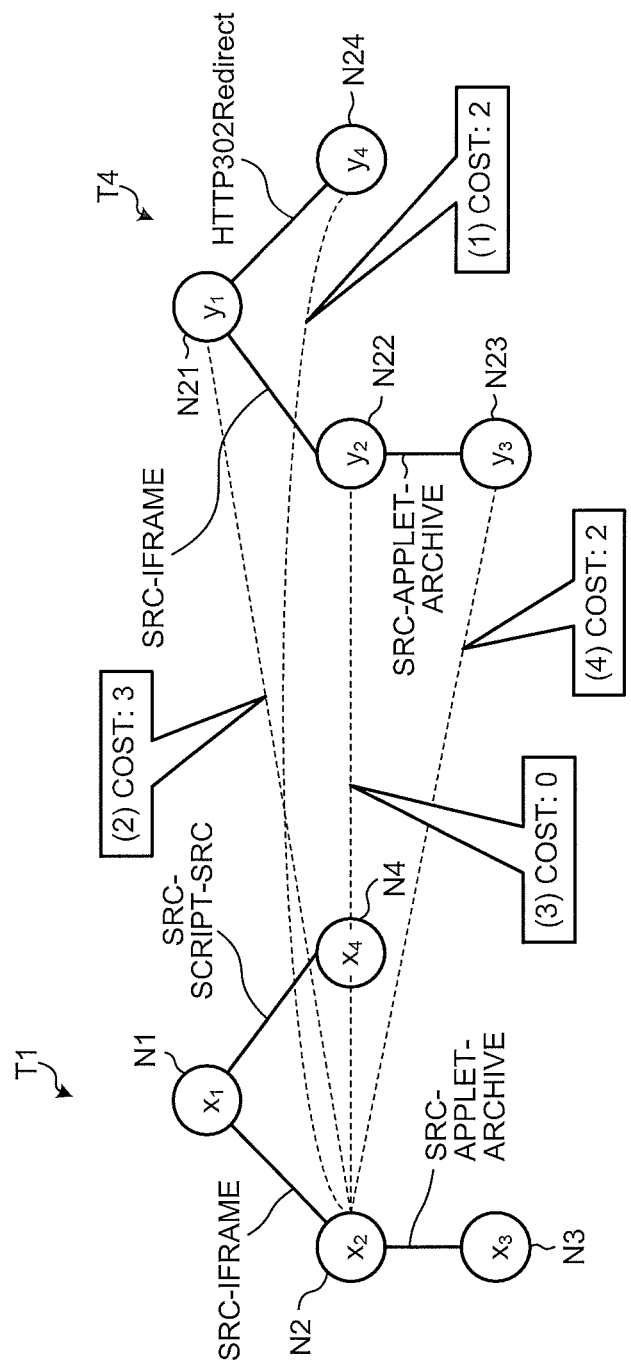
FIG. 8 is a diagram illustrating another example of node association between a plurality of trees.

With reference to FIGS. 7 and 8, the details will be described. FIGS. 7 and 8 are diagrams illustrating another example of a node association example between a plurality of trees. For example, the calculation of the cost of the node N2 of the tree T1 and a node N24 of a tree T4 in FIG. 7 will be described.

First, for the node N2 and the node N24, the node association unit 14 compares redirections in which the nodes N2 and the node N24 of interest are redirection destinations. In this case, the edge of the redirection in which the node N2 is the redirection destination is "SRC-IFRAME," and the edge of the redirection in which the node N24 is the redirection destination is "HTTP302Redirect." Thus, the redirections are different. Accordingly, for the node N2 and the node N24, the node association unit 14 determines that the number of edges of different redirections in which the node N2 and the node N24 of interest are the redirection destinations is "1" (see (1) in FIG. 7).

Subsequently, the node association unit 14 compares redirections in which the node N2 and the node N24 of interest are the redirection sources. In this case, the edge of the redirection in which the node N2 is the redirection source is "SRC-APPLET-ARCHIVE," and there is no edge of redirection in which the node N24 is the redirection source. When there is no corresponding edge like this, the node association unit 14 also calculates "1" (see (2) in FIG. 7).

Therefore, the cost when the node N2 is associated with the node N24 is "2," which is the sum of "1," the number of edges of different redirections in which the nodes of interest are the redirection destinations, and "1," the number of edges of different redirections in which the nodes of interest are the redirection sources (see (3) in FIG. 7).

In this manner, the node association unit 14 calculates the cost for each combination of nodes in the tree T1 and the tree T4. As a result, as illustrated in FIG. 8, as for the combination of the node N2 of the tree T1 and the node N24 of the tree T4, the node association unit 14 can obtain the cost "2" as described above (see (1) in FIG. 8) For the combination of the node N2 and a node N21, the node association unit 14 can obtain the cost "3" (see (2) in FIG. 8). For the combination of the node N2 and a node N22, the node association unit 14 can obtain the cost "0" (see (3) in FIG. 8). For the combination of the node N2 and a node N23, the node association unit 14 can obtain the cost "2" (see (4) in FIG. 8). In this manner, the costs in all combinations of the nodes of the tree T1 and the nodes of the tree T4 are obtained.

Then, the node association unit 14 determines a combination with the minimum sum total of costs of associated nodes, among the associations of the nodes of the tree T1 with the nodes of the tree T4. For example, the sum total of costs when all nodes of a tree having a smaller number of nodes are associated with nodes of another tree is calculated for possible associations to determine an association with the minimum sum total of costs. At this time, it is not allowed that a plurality of nodes is associated with one node. The way of associating nodes is an example. It is only required that nodes having similar connected edges can be associated with each other.

Note that the node association unit 14 may output all node associations, or may output only a combination of nodes whose connected edges are all the same, or a combination of nodes in which the ratio of the number of identical edges to the number of connected edges is equal to or larger than a threshold. The definition of the cost is an example, and the present invention is not limited to this. It is sufficient to define the cost so that the cost becomes smaller as the number of identical edges is larger.

Of Node Association Example 1 and Node Association Example 2 described above, the method based on subtrees illustrated in Node Association Example 1 is designed so that the influence of a long redirection is increased. Therefore, when it is confirmed that a long redirection occurs, the method based on subtrees illustrated in Node Association Example 1 is effective. On the other hand, even when a long redirection cannot be assumed, the method based on adjacent edges illustrated in Node Association Example 2 can be applied.

In both Node Association Example 1 and Node Association Example 2, the association methods are based on local structures. Thus, if attack code is concealed, it is possible to associate nodes without problems. For this reason, by determining similarity between trees after node association is performed, is possible to detect whether an access of interest is a malicious website or not. Next, processing of calculating similarity between trees will be described.

[Tree Similarity Calculation]

Figure 9:
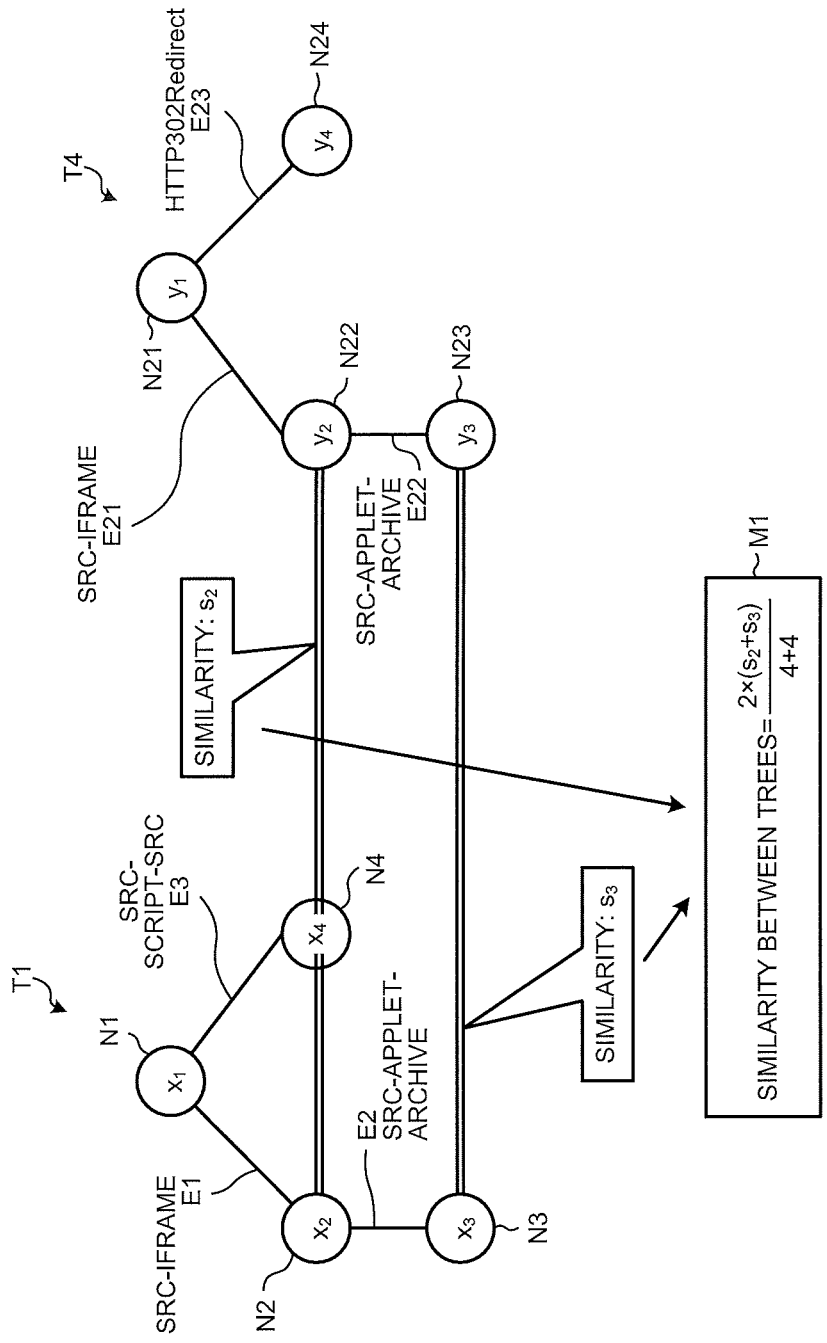
FIG. 9 is a diagram illustrating tree similarity calculation processing performed by a similarity calculation unit illustrated in FIG. 1.

Next, the calculation of similarity between trees by the similarity calculation unit 15 illustrated in FIG. 1 will be described. The similarity calculation unit 15 calculates similarity, based on the results of node association in a plurality of trees determined by the node association unit 14 using the method illustrated in FIG. 6 or FIGS. 7 and 8. FIG. 9 is a diagram illustrating tree similarity calculation processing by the similarity calculation unit 15.

FIG. 9 illustrates an example of calculating similarity between the tree T1 and the tree T4. Among the nodes in the tree T1 and the tree T4, the node N2 of the tree T1 corresponds to the node N22 of the tree T4, and the node N3 of the tree T1 corresponds to the node N23 of the tree T4.

First, the similarity calculation unit 15 calculates similarity between nodes corresponding to each other, using content information of each node. In this case, the similarity calculation unit 15 defines similarity between nodes corresponding to each other by the Euclidean distance between feature vectors. That is, for a node Nk of one tree to which content information $x_k$ is added, and a node Nh of another tree to which content information $y_h$ is added, the similarity calculation unit 15 sets the Euclidean distance $s_{k,h}$ calculated using Formula (1) as similarity between the node Nk and the node Nh associated with each other. Note that similarity between nodes corresponding to each other is not limited to the Euclidean distance between feature vectors. Instead, L1 norm (the sum of the absolute values of differences in different dimensions) or the like may be used.

$$s_{k,h} = \sqrt{|x_k - y_h|^2} \qquad (1)$$

For example, the similarity calculation unit 15 calculates similarity $s_{2,22}$ between the node N2 of the tree T1 and the node N22 of the tree T4, using Formula 2 in which content information $x_2$ added to the node N2 and content information $y_2$ added to the node N22 are applied to Formula (1).

$$s_{2,22} = \sqrt{|x_2 - y_2|^2} \qquad (2)$$

Also, the similarity calculation unit 15 calculates similarity $s_{3,23}$ between the node N3 of the tree T1 and the node N23 of the tree T4 by applying content information $x_3$ added to the node N3 and content information $y_3$ added to the node N23 to Formula (1). In this way, for each combination of nodes corresponding to each other in two trees for which similarity is calculated, the similarity calculation unit 15 calculates similarity, using content information added to the nodes corresponding to each other.

Then, the similarity calculation unit 15 defines similarity between the two trees as "2דthe total sum of similarities between associated nodes"÷"the sum of the numbers of nodes"." For example, when determining similarity between the tree T1 and the tree T4 illustrated in FIG. 9, the similarity calculation unit 15 applies, to this definition, similarity $s_2$ between the node N2 and the node N22 corresponding to each other, and similarity $s_3$ between the nodes N3 and the node N23 corresponding to each other. Then, the similarity calculation unit 15 applies the number of the nodes of the tree T1, "4," and the number of the nodes of the tree T4, "4," as the sum of the numbers of the nodes, to this definition. Therefore, the similarity calculation unit 15 calculates (2×($s_2+s_3$)/(4+4)) (see frame M1) where the sum total of the similarities between the associated nodes ($s_2+s_3$) and the sum of the numbers of the nodes (4+4) are applied to this definition, thereby determining similarity between the tree T1 and the tree T4.

Note that in FIG. 9, the similarity calculation method for the two trees T1 and T4 is illustrated, but the number of trees to be compared may be two or more. Further, the method of calculating similarity calculated using FIG. 9 is an example. The present invention is not limited to this, and may use any method based on similarity between associated nodes.

[Processing of Classification Unit]

Next, a classification method for a tree to be classified by the classification unit 16 will be described. A machine learning algorithm is applied using similarity between accesses calculated by the similarity calculation unit 15, and an identification model and an identification result are output.

[Processing Procedure of Identification Model Creation Processing]

Figure 10:
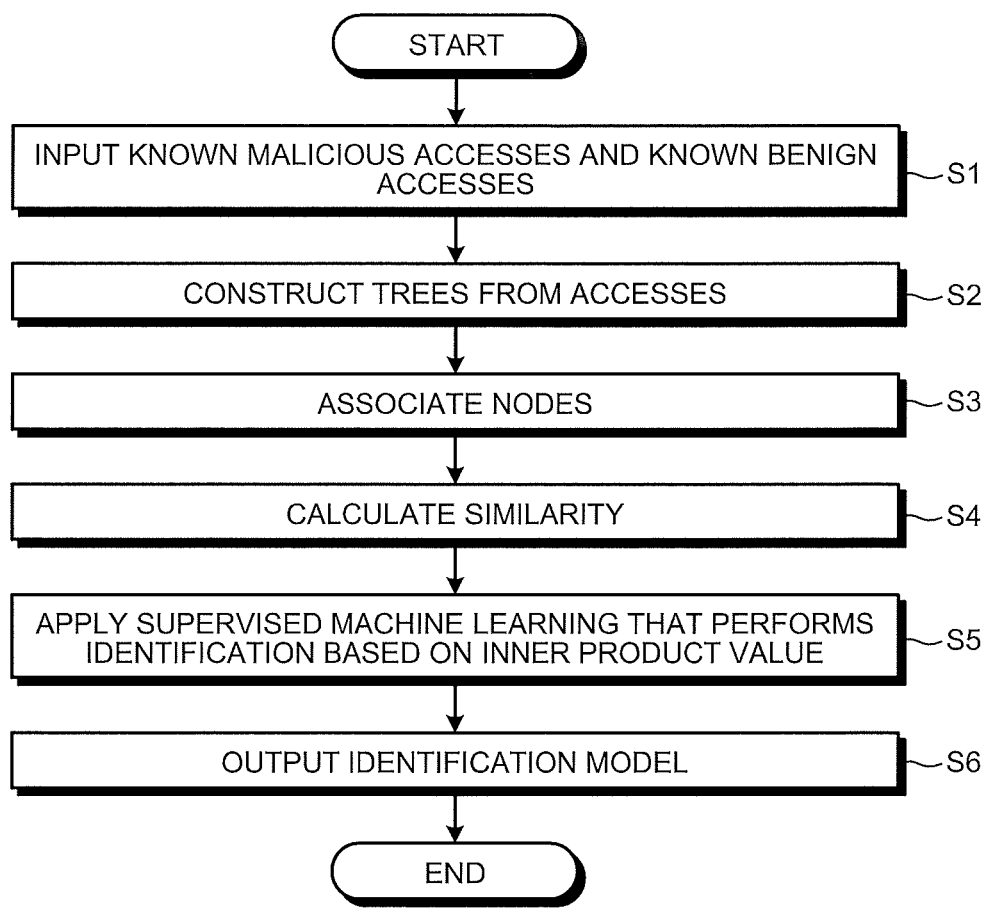
FIG. 10 is a flowchart illustrating identification model creation processing when similarity is used as an inner product value.
Figure 11:
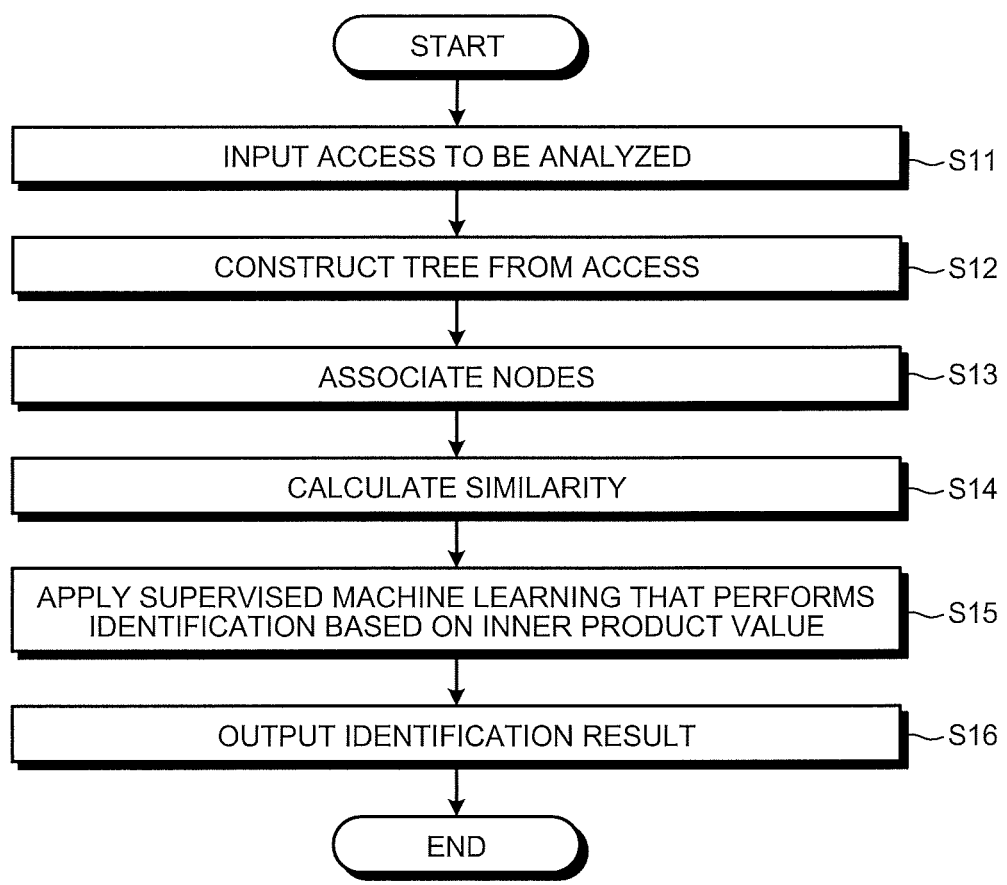
FIG. 11 is a flowchart illustrating a processing procedure of access identification processing when similarity is used as an inner product value.

Next, with reference to FIGS. 10 and 11, the operation of the access classification device 10 will be described in more detail.

Illustrated first is an example of identification model creation when similarity between a plurality of trees calculated by the similarity calculation unit 15 is used as an inner product value after conversion into a vector on a feature space. Note that an identification model outputs the result of identification (identification of benignity, identification of malignancy, etc.) when input data (a numerical vector of each piece of data or an inner product value of pieces of data) is input. FIG. 10 is a flowchart illustrating the processing procedure of the identification model creation processing when similarity is used as an inner product value.

First, the known access input unit 12 inputs known malicious accesses and known benign accesses (see FIGS. 3A and 3B) (step S1). Subsequently, the tree construction unit 13 constructs trees from the input accesses (see FIG. 4), and extracts subtrees from the constructed trees (see FIG. 5) (step S2).

Then, the node association unit 14 performs node association between the plurality of trees (step S3). In this case, the node association unit 14 performs node association between the plurality of trees, using the method illustrated in FIG. 6 or FIGS. 7 and 8, and determines node correspondence between the plurality of trees.

Subsequently, based on the results of association between nodes of the plurality of trees determined by the node association unit 14, the similarity calculation unit 15 calculates similarity between the plurality of trees, using content information added to each node, using the method described in FIG. 9 (step S4).

Then, the classification unit 16 applies existing supervised machine learning that uses an inner product value after the conversion of input into a high-dimensional space, using similarity between trees as an inner product value, and the known malicious accesses and the known benign accesses as training data (Step S5), and outputs an identification model (step S6). In other words, the classification unit 16 applies the accesses input in step S1 and the similarity calculated in step S4 to the supervised machine learning that uses an inner product value after the conversion of input into the high-dimensional space. That is, the classification unit 16 creates an identification model by the supervised machine learning that sets the known benign accesses and the known malicious accesses input in step S1 as "training data," and sets the similarity calculated in step S4 as an "inner product value" after the training data is converted into vectors on the feature space. For example, when the classification unit 16 uses, as an identification model, a method of determining the identification result based on whether the weighted sum of the inner product values of the known malicious accesses and the known benign accesses and the access to be identified is positive or negative, the weight corresponding to each known access is output as a model parameter. Note that the supervised machine learning method is, for example, a support vector machine, but is not limited to this.

The classification unit 16 outputs the created identification model to a hard disk drive 1090 described later. The output identification model is stored as data in the hard disk drive 1090.

[Access Identification Processing]

Subsequently, an access identification example when similarity between a plurality of trees calculated by the similarity calculation unit 15 is used as an inner product value after conversion into a vector on the feature space will be described. FIG. 11 is a flowchart illustrating the processing procedure of access identification processing when similarity is used as an inner product value.

First, the access-of-interest input unit 11 inputs an access to be analyzed (see FIG. 2) (step S11). Subsequently, the tree construction unit 13 constructs a tree from the input access (see FIG. 4), and extracts subtrees from the constructed tree (see FIG. 5) (step S12).

Then, the node association unit 14 performs node association between the tree corresponding to the analyzed access and a tree corresponding to a known access for comparison (step S13). In this case, the node association unit 14 uses the method illustrated in FIG. 6 or FIGS. 7 and 8 to perform node association between the tree corresponding to the analyzed access and the tree corresponding to the known access for comparison to determine node correspondence between the two trees.

Then, the similarity calculation unit 15 calculates similarity between the tree corresponding to the analyzed access and the tree corresponding to the known access for comparison, using content information added to each node (step S14). In this case, the similarity calculation unit 15 calculates similarity between the tree corresponding to the analyzed access and the tree corresponding to the known access for comparison, using the method described in FIG. 9, based on the results of node association between the tree corresponding to the analyzed access and the tree corresponding to the known access for comparison determined by the node association unit 14.

Subsequently, the classification unit 16 applies existing supervised machine learning that reads previously learned identification models and uses an inner product value after the conversion of input into a high-dimensional space, using the similarity between the trees as an inner product value, and setting the analyzed access as test data (step S15), and outputs an identification result (step S16). In other words, the classification unit 16 applies the access input in step S11 and the similarity calculated in step S14 to the supervised machine learning that uses an inner product value after the conversion of input into the high-dimensional space. That is, by the supervised machine learning that sets the analyzed access input in step S11 as "test data," and sets the similarity calculated in step S14 as an "inner product value" after the test data is converted into a vector on the feature space, the classification unit 16 creates an identification result.

For example, as an identification result, the classification unit 16 classifies whether or not the analyzed access is similar in feature to the known access for comparison. For example, when the known access for comparison is a malicious known access, and the analyzed access is classified as one similar in feature to the known access for comparison, an identification result is output in which it is determined to be an access to a malicious website.

Note that the supervised machine learning method is, for example, a support vector machine, but is not limited to this as long as it is the same method as the method used in the above-described identification model creation processing. In step S16, the classification unit 16 outputs the created identification result to a display device such as a display 1130 described later. The processing illustrated in FIG. 11 is executed for each known access set for comparison.

Effects of First Embodiment

As described above, when constructing a tree from an input access, the access classification device 10 according to the first embodiment adds content information to nodes of the tree. Then, the access classification device 10 determines correspondence between nodes constituting a plurality of trees, calculates similarity between the trees using similarity between nodes associated with each other between the trees, and then classifies a series of accesses to a destination including automatic transfer, using the calculated similarity.

As a result, in the first embodiment, even when there is a malicious website that automatically transfers an access from a user terminal to a web server, and attacks the vulnerability of a browser or a plug-in on a website as the transfer destination, thereby causing it to download malware, the access classification device 10 can detect it based on similarity between contents having a similar redirection relationship with each other. Consequently, by blocking an access of a user terminal to a website determined to be malicious, the access classification device 10 can prevent infection of the user terminal with malware. Therefore, according to the first embodiment, it is possible to identify a malicious website from the structure of a website including automatic transfer and the features of content. Further, according to the first embodiment, it is possible to construct a malicious website identification method that enables identification by one access.

As content information added to a node of a tree, the access classification device 10 creates one in which content is numerically expressed, and only information of malicious content is extracted. As a result, in the first embodiment, even when meaningless code is added to malicious content, or code irrelevant to attack is deleted, a change in a numerically expressed vector is small. Thus, a malicious website can be detected, and it is possible to make circumvention by an attacker difficult.

In the processing of extracting subtrees, the access classification device 10 extracts subtrees focusing on paths. In other words, the access classification device 10 is considered to be able to reduce the amount of calculation by extracting subtrees representing malicious features, and reducing the number of subtrees subjected to node association in subsequent processing.

In addition, since the access classification device 10 performs node association based on local structures of trees, it is possible to associate nodes even when attack code is concealed. By determining similarity between trees based on content information after performing this node association, the access classification device 10 can accurately calculate similarity between an analyzed access and a malicious website or a benign site. That is, in the first embodiment, even when attack code is concealed, it is possible to accurately classify an analyzed access.

As described above, by considering redirection-based relationships between a plurality of contents in addition to attention to the form of a redirection graph, the first embodiment increases the accuracy of determining whether it is close to either a malicious feature or a benign feature. Therefore, the first embodiment enables a web search that is difficult for an attacker to circumvent, and can achieve detection with high detection accuracy even for malicious websites from which attack code cannot be obtained and the graph of which becomes small.

Second Embodiment

Next, an access classification device according to a second embodiment will be described in terms of a schematic configuration, a flow of access classification processing, and specific examples.

Figure 12:
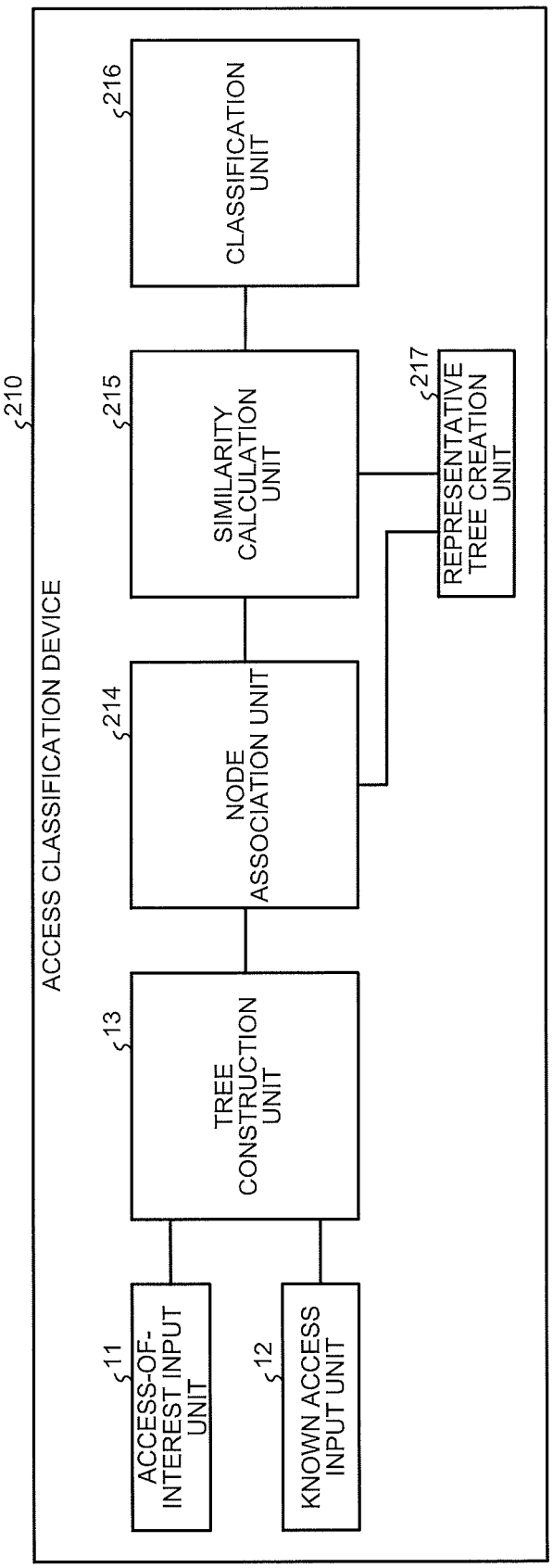
FIG. 12 is a schematic diagram illustrating a schematic configuration of an access classification device according to a second embodiment.

FIG. 12 is a schematic diagram illustrating a schematic configuration of an access classification device according to the second embodiment. As illustrated in FIG. 12, an access classification device 210 according to the second embodiment includes, in place of the node association unit 14, the similarity calculation unit 15, and the classification unit 16 illustrated in FIG. 1, a node association unit 214, a similarity calculation unit 215, and a classification unit 216. The access classification device 210 further includes a representative tree creation unit 217, as compared with the access classification device 10 of FIG. 1.

The node association unit 214 has a function similar to that of the node association unit 14, and also associates nodes of a tree corresponding to a known access or a tree corresponding to an access to a destination to be analyzed, with nodes of a representative tree (described later). The similarity calculation unit 215 has a function similar to that of the similarity calculation unit 15, and also calculates similarity between a tree corresponding to an access and a representative tree (described later), using similarity between nodes associated with each other in these trees.

The classification unit 216 classifies an access based on similarity between a representative tree (described later) and a tree corresponding to the access.

The representative tree creation unit 217 classifies a plurality of trees into a plurality of sets each composed of trees with high similarity, based on similarity calculated by the similarity calculation unit 215. Then, the representative tree creation unit 217 creates a subtree representing the features of each set as a representative tree. The representative tree creation unit 217 divides accesses input by the known access input unit 12 into a plurality of sets based on similarity calculated by the similarity calculation unit 215, and creates a subtree common to trees in each set as a representative tree.

[Representative Tree Creation]

Figure 13:
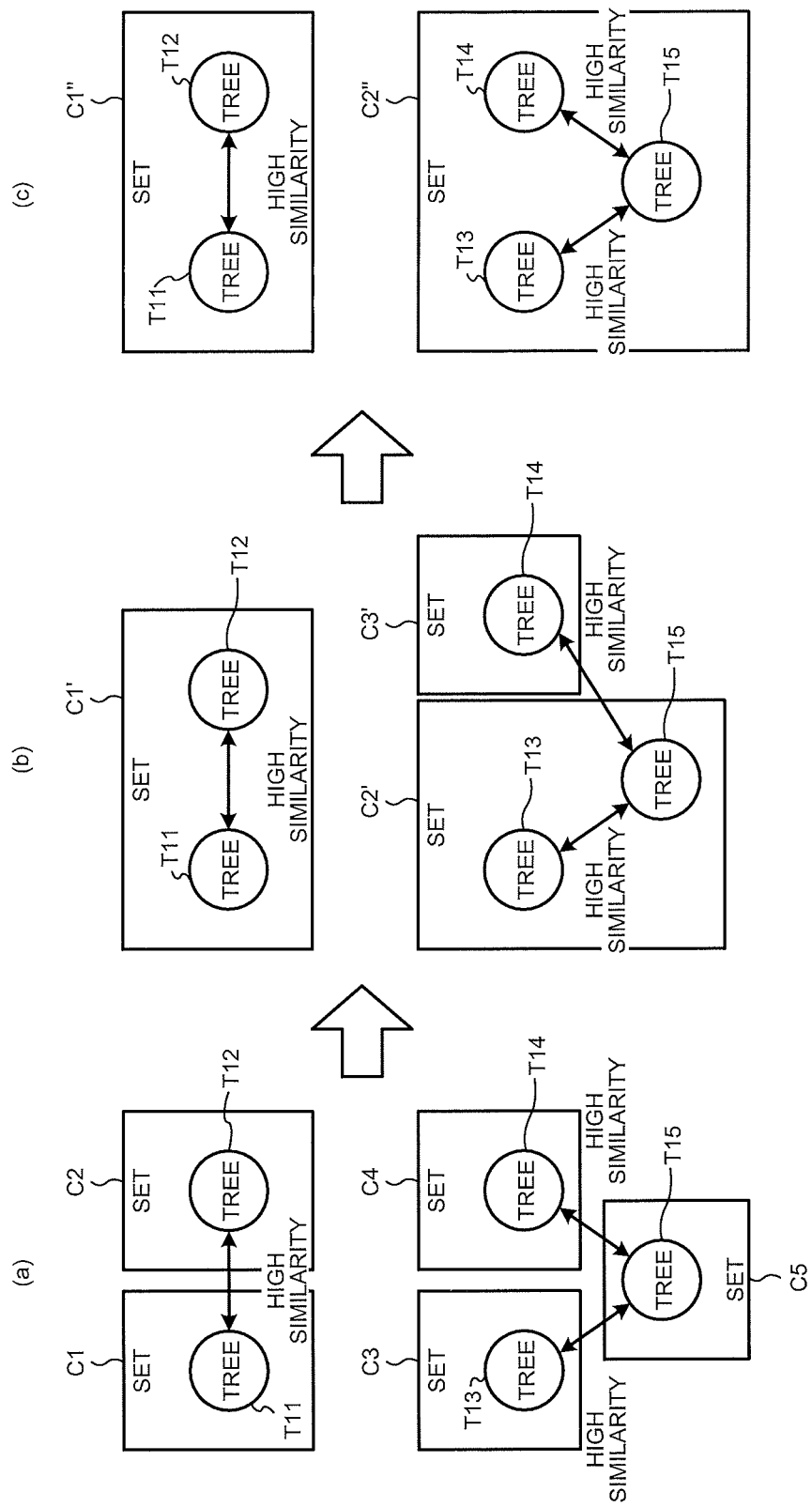
FIG. 13 is a diagram illustrating a method of classifying a plurality of trees into a plurality of sets.

In the creation of a representative tree, a plurality of trees is divided into a plurality of sets, and a representative tree is created from each set. FIG. 13 is a diagram illustrating a method of classifying a plurality of trees into a plurality of sets.

As illustrated in FIG. 13, the representative tree creation unit 217 divides a plurality of trees (accesses) illustrated in FIG. 4 into a plurality of sets each composed of trees with high similarity. The representative tree creation unit 217 combines sets each of which is composed of only one tree when a maximum value of similarity between the trees belonging to the sets is equal to or larger than a threshold. The representative tree creation unit 217 repeatedly executes this combining processing until there is no set to combine.

For example, in an example illustrated in FIG. 13 (a), sets C1 to C5 are each composed of only one tree (trees T11 to T15). The classification unit 16 classifies the plurality of trees T11 to T15 into a plurality of sets C1' to C3' each composed of a tree or trees with high similarity. In an example illustrated in FIG. 13 (b), the set C1 and the set C2 to which the tree T11 and the tree T12 with a maximum value of similarity equal to or larger than a threshold belong, respectively, are combined and classified into the same set C1'. Likewise, the set C3 and the set C5 to which the tree T13 and the tree T15 with a maximum value of similarity equal to or larger than the threshold belong, respectively, are combined and classified into the same set C2'.

Since this combining processing is repeatedly executed, as illustrated in FIG. 13(c), in all the trees T11 and T12 belonging to the set C1", a maximum value of similarity to the other tree belonging to the same set C1" is equal to or larger than the threshold. Likewise, in all the trees T13 to T15 belonging to the set C2", a maximum value of similarity to the other trees belonging to the same set C2" is equal to or larger than the threshold. This allows classification into a plurality of sets (the set C1" and the set C2") each composed of trees with high similarity (the trees T11 and T12 and the trees T13 to T15).

Note that the classification unit 216 uses a maximum value of similarity as a reference for combining sets, but is not limited to this, and may use a minimum value or an average value of similarity. When a maximum value of similarity is used, a set of trees with some common subtrees commonly included in a plurality of trees is created. When a minimum value of similarity is used instead of a maximum value, the classification unit 16 can create a set of trees with many common subtrees. When an average value is used, the classification unit 16 can create a set of trees intermediate between them. Although a threshold is set as a reference for combining sets, instead of setting a threshold, the classification unit 16 may preferentially combine sets having a maximum degree of similarity, and repeat the combining processing until all becomes one set, and then determine what stage to use in the process of combining sets. The number of sets to be combined is not limited to two, and may be two or more.

Figure 14:
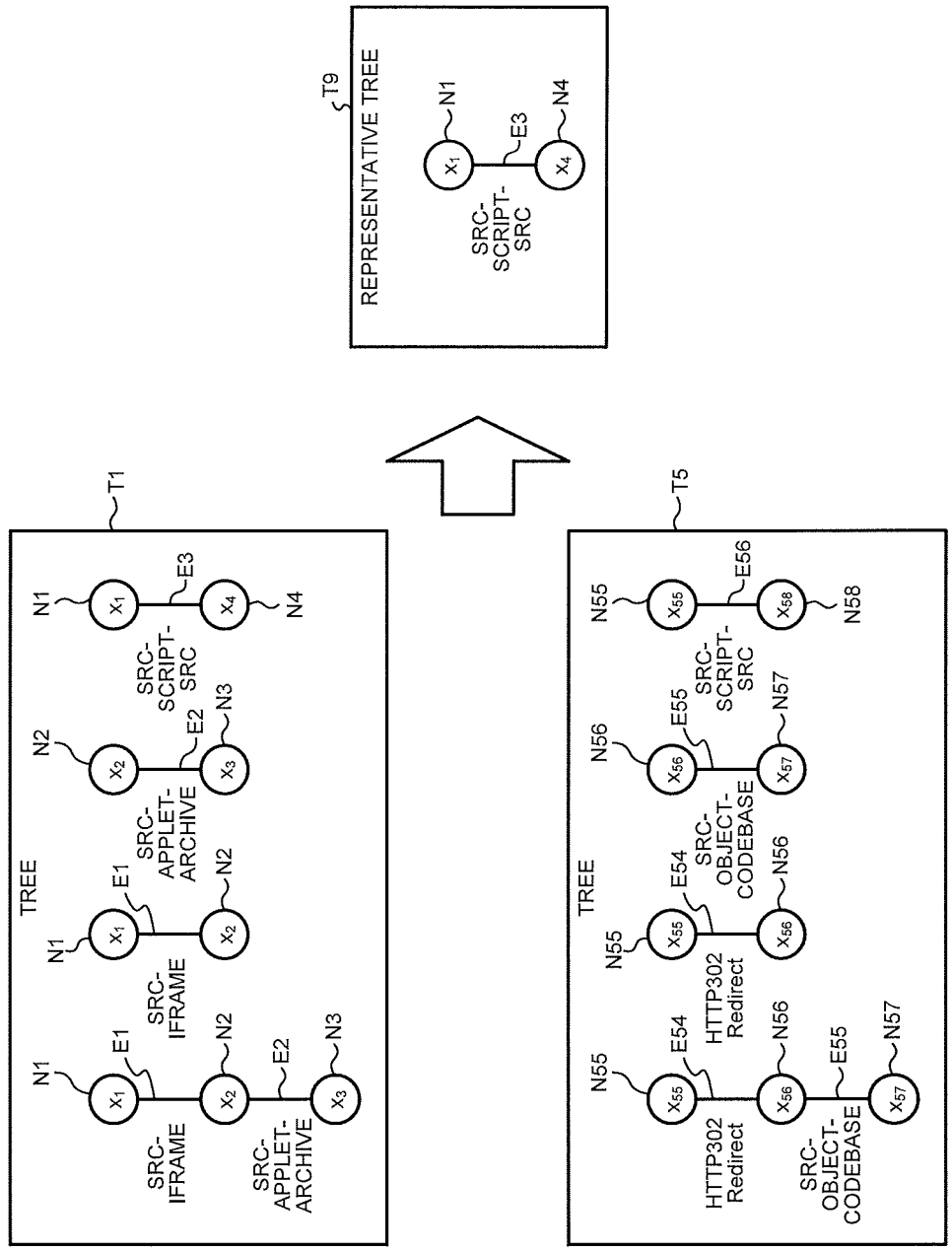
FIG. 14 is a diagram illustrating a method of creating a representative tree from a set of trees.

FIG. 14 is a diagram illustrating a method of creating a representative tree from a set of trees. As illustrated in FIG. 14, the access classification device 210 creates, by the representative tree creation unit 217, a representative tree from a set of trees created by the representative tree creation unit 217 (see FIG. 13), based on subtrees extracted by the tree construction unit 13 (see FIG. 5). For example, the representative tree creation unit 217 sets a subtree common to all trees in a set as a representative tree. In an example illustrated in FIG. 14, the representative tree creation unit 217 sets a subtree (N1-E3-N4) common to the trees T1 and T5 in the same set as a representative tree T9 representing the features of this set. Alternatively, as a representative tree, a common subtree may be extracted with content ignored, and an average of feature vectors of nodes may be used as content information.

Note that the representative tree creation unit 217 sets a subtree common to all trees in a set as a representative tree, but is not limited to this, and may set a set of subtrees included in a predetermined proportion or more of trees in a set as a representative tree. In a mode where URL information attached to nodes N1 to N4 and N55 to N58 is not removed, the representative tree creation unit 217 may perform match-mismatch determination for the creation of the representative tree T9, including the URL information in addition to transfer instructions. The number of trees to be compared is not limited to two, and may be two or more.

[Processing Procedure of Identification Model Creation Processing]

Next, with reference to FIG. 15 and FIG. 16, the operation of the access classification device 210 will be described in more detail.

Figure 15:
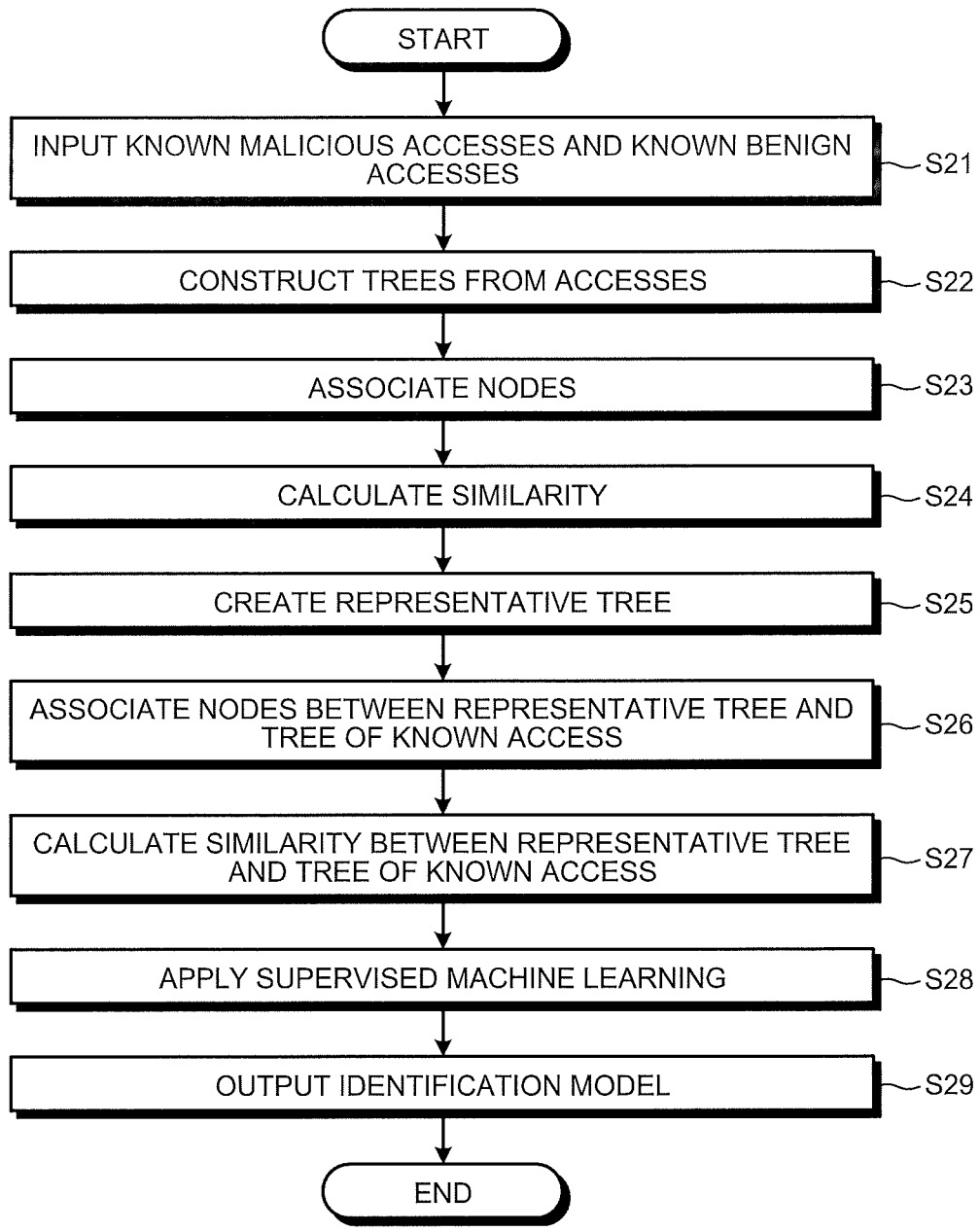
FIG. 15 is a flowchart illustrating a processing procedure of identification model creation processing when similarity to a representative tree is used.

FIG. 15 is a flowchart illustrating the processing procedure of the identification model creation processing when similarity to a representative tree is used. Note that FIG. 15 includes a plurality of steps similar to those in FIG. 10, and thus a reference numeral with the same number at the end is assigned to a common step without detailed description thereof. Specifically, processing in steps S21 to S24 and S29 in FIG. 15 corresponds to the processing in steps S1 to S4 and S6 illustrated in FIG. 10, respectively.

Based on similarity calculated in step S24, the representative tree creation unit 217 classifies a plurality of trees constructed in step S22 into a plurality of sets each composed of trees with high similarity (see FIG. 13), and creates a subtree representing the features of each set (for example, a common subtree in the same set) as a representative tree for each set (see FIG. 14) (step S25).

Subsequently, the node association unit 214 performs node association between the representative tree and a tree of a known access, using the method illustrated in FIG. 6 or FIGS. 7 and 8 (step S26). Then, the similarity calculation unit 215 calculates similarity between the representative tree and the tree of the known access, using content information added to each node (see FIG. 9) (step S27). Note that in steps S26 and S27, the access classification device 210 performs the processing for each input known access, and proceeds to processing in the next step S28 after performing steps S26 and S27 on all known accesses.

Then, the classification unit 216 applies supervised machine learning that uses a vector in which similarities to a representative tree are aligned as a feature vector of an access (step S28) to create an identification model. Note that the supervised machine learning method is a linear discriminant analysis, a support vector machine, a random forest, or the like, but is not limited to these methods.

[Access Identification Processing]

Figure 16:
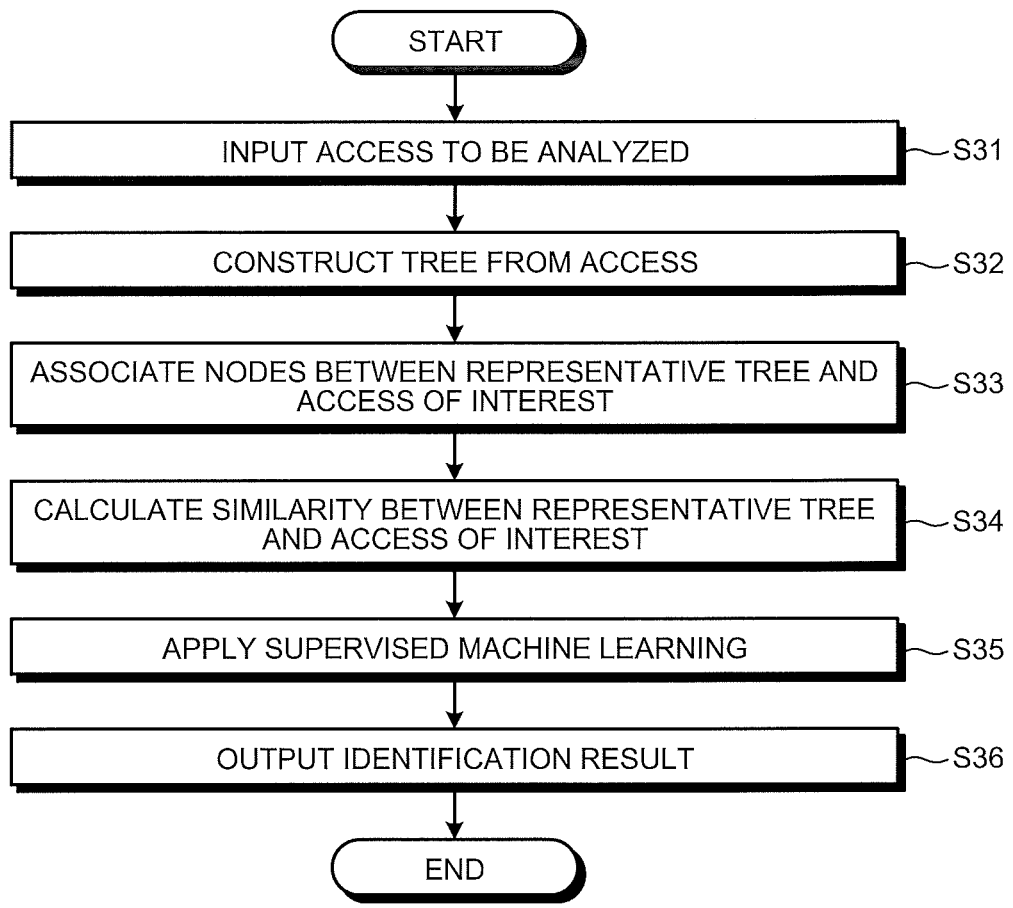
FIG. 16 is a flowchart illustrating access identification processing when similarity to a representative tree is used.

FIG. 16 is a flowchart illustrating the processing procedure of access identification processing when similarity to a representative tree is used. FIG. 16 includes a plurality of steps similar to those in FIG. 11, and thus a reference numeral with the same number at the end is assigned to a common step without detailed description thereof. Specifically, processing in steps S31, S32, and S36 in FIG. 16 corresponds to the processing in steps S11, S12, and S16 illustrated in FIG. 11, respectively.

The node association unit 214 performs node association between a representative tree and a tree of an access of interest (step S33). Then, the similarity calculation unit 215 calculates similarity between the tree of the access of interest and the representative tree created by the representative tree creation unit 217, using similarity between nodes associated with each other in these trees (Step S34).

Subsequently, using a vector in which similarities to the representative tree are aligned as a feature vector of the access, supervised machine learning is applied (step S35), and an identification result is output (step S36).

Note that the supervised machine learning method is, for example, a linear discriminant analysis, a support vector machine, a random forest, or the like, but is not limited to these methods as long as it is the same method as the method used in the identification model creation processing in FIG. 15.

Effects of Second Embodiment

As described above, the access classification device 210 according to the second embodiment calculates similarity between a representative tree and an access, using similarity in content between nodes associated with each other between the representative tree and a tree corresponding to the access, to classify the access. Therefore, also in the configuration of comparing a representative tree and an access described in the second embodiment, by also considering similarity in content between nodes associated with each other between a representative tree and a tree corresponding to an access, identification accuracy can be increased.

Another Embodiment

[System Configuration and Others]

The constituent elements of the devices illustrated in the drawings are functionally conceptual, and do not necessarily have to be physically configured as illustrated in the drawings. That is, the specific form of distribution/integration of each device is not limited to those illustrated in the drawings, and all or part of them may be distributed or integrated functionally or physically in arbitrary units, according to various loads, usage conditions, and the like. In addition, all or desired part of each processing function performed in each device can be implemented by a CPU (Central Processing Unit) and a program analyzed and executed by the CPU, or implemented as hardware by wired logic.

Among the processing described in the embodiments, all or part of the processing described as being performed automatically can alternatively be performed manually, or all or part of the processing described as being performed manually can alternatively be performed automatically by a known method. In addition, the processing procedures, control procedures, specific names, and information including various kinds of data and parameters described in the document or in the drawings can be changed as desired unless otherwise specified.

[Program]

FIG. 17 is a diagram illustrating an example of a computer on which the access classification device 10 or 210 is implemented by a program being executed. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These units are connected by a bus 1080.

The memory 1010 includes a ROM (Read Only Memory) 1011 and a RAM (Random Access Memory) 1012. The ROM 1011 stores, for example, a boot program such as the BIOS (Basic Input Output System). The hard disk drive interface 1030 is connected to a hard disk drive 1090. The disk drive interface 1040 is connected to a disk drive 1100. For example, a detachable storage medium such as a magnetic disk or an optical disk is inserted into the disk drive 1100. The serial port interface 1050 is connected, for example, to a mouse 1110 and a keyboard 1120. The video adapter 1060 is connected to a display 1130, for example.

The hard disk drive 1090 stores, for example, an OS 1091, an application program 1092, a program module 1093, and program data 1094. That is, programs that define processing of the access classification device 10 or 210 are implemented as a program module 1093 in which code executable by the computer 1000 is written. The program module 1093 is stored in the hard disk drive 1090, for example. For example, the program module 1093 for executing processing similar to the functional configuration in the access classification device 10 or 210 is stored in the hard disk drive 1090. Note that the hard disk drive 1090 may be replaced by a SSD (Solid State Drive).

Setting data used in the processing in the above-described embodiments is stored as program data 1094 in the memory 1010 or the hard disk drive 1090, for example. The CPU 1020 reads the program module 1093 or the program data 1094 stored in the memory 1010 or the hard disk drive 1090 on the RAM 1012 as necessary for execution.

The program module 1093 and the program data 1094 are not limited to being stored in the hard disk drive 1090, and may be stored, for example, in a detachable storage medium and read by the CPU 1020 via the disk drive 1100 or the like. Alternatively, the program module 1093 and the program data 1094 may be stored in another computer connected via a network (such as a LAN (Local Area Network) or a WAN (Wide Area Network)). The program module 1093 and the program data 1094 may be read from the other computer by the CPU 1020 via the network interface 1070.

The embodiments to which the invention made by the present inventors is applied have been described above, but the present invention is not limited by the description and the drawings that form part of the disclosure of the present invention according to the present embodiments. That is, other embodiments, examples, operation techniques, and the like that are performed by those skilled in the art based on the present embodiments are all included in the scope of the present invention.

REFERENCE SIGNS LIST 10, 210 ACCESS CLASSIFICATION DEVICE
11 ACCESS-OF-INTEREST INPUT UNIT
12 KNOWN ACCESS INPUT UNIT
13 TREE CONSTRUCTION UNIT
14, 214 NODE ASSOCIATION UNIT
15, 215 SIMILARITY CALCULATION UNIT
16, 216 CLASSIFICATION UNIT
217 REPRESENTATIVE TREE CREATION UNIT
C1 to C5, C1' to C3', C1", C2" SET
E1 to E7, E21 to E23, E54 to E56 EDGE
N1 to N12, N21 to N24, N55 to N58 NODE
T1, T2, T3, T4, T5, T11 to T15 TREE
T1-1, T1-2, T1-3, T1-4, T2-1, T3-1 SUBTREE
T9 REPRESENTATIVE TREE

The invention claimed is:

1. An access classification device comprising:
processing circuitry configured to:
construct a plurality of trees in each of which at least a first destination and a second destination are set as nodes which correspond to different websites, content information corresponding to the nodes is added to the nodes, and an automatic transfer instruction, which is a type of instruction from a plurality of different predetermined types of instructions, to transfer an access from the first destination to the second destination, is set as an edge which connects the nodes within the respective tree;
associate nodes of the plurality of trees with each other for the plurality of trees constructed, based on similarity between local structures of the trees;
calculate similarity between the nodes associated with each other in the plurality of trees, based on the content information added to the nodes, and calculate similarity between the plurality of trees using the calculated similarity between the nodes associated with each other; and
classify the access into a set with similar features, based on the similarity calculated
wherein the processing circuitry is further configured to:
extract subtrees from each of the plurality of trees constructed, and
initially identify a plurality of subtrees based only on the automatic transfer instructions which are set as the edges of the plurality of subtrees matching each other and independent of any features of each of nodes connected by the edges of the plurality of subtrees, among the subtrees extracted for the plurality of trees, and then determine correspondence between nodes in the plurality of trees, based on correspondence between the nodes in the plurality of subtrees identified.

2. The access classification device according to claim 1, wherein the processing circuitry is further configured to associate a combination of nodes having a high degree of matching between the automatic transfer instructions that are set as the edges connected to the nodes, for the plurality of trees.

3. The access classification device according to claim 1, wherein the processing circuitry is further configured to calculate an inner product value of the plurality of trees in a feature space, using the similarity calculated, and classify the access.

4. The access classification device according to claim 1, wherein the processing circuitry is further configured to:
classify the plurality of trees into a plurality of sets each composed of a plurality of trees with high similarity, based on the similarity calculated, and create a subtree representing features of each set as a representative tree;
associate nodes of a tree corresponding to an access to a destination constructed and the representative tree with each other;
calculate similarity between the tree corresponding to the access to the destination and the representative tree; and
classify the access, based on the similarity between the representative tree and the tree corresponding to the access to the destination.

5. An access classification method executed by an access classification device that classifies an input access into a set with similar features, the access classification method comprising:
constructing a plurality of trees in each of which at least a first destination and a second destination are set as nodes which correspond to different websites, content information corresponding to the nodes is added to the nodes, and an automatic transfer instruction, which is a type of instruction from a plurality of different predetermined types of instructions, to transfer an access from the first destination to the second destination, is set as an edge which connects the nodes within the respective tree;
associating nodes of the plurality of trees with each other for the plurality of trees constructed at the constructing, based on similarity between local structures of the trees;
calculating similarity between the nodes associated with each other in the plurality of trees, based on the content information added to the nodes, and calculating similarity between the plurality of trees using the calculated similarity between the nodes associated with each other, by a processor; and
classifying the access into a set with similar features, based on the similarity calculated at the calculating,
wherein the method further includes:
extracting subtrees from each of the plurality of trees constructed, and
initially identifying a plurality of subtrees based only on the automatic transfer instructions which are set as the edges of the plurality of subtrees matching each other and independent of any features of each of nodes connected by the edges of the plurality of subtrees, among the subtrees extracted for the plurality of trees, and then determining correspondence between nodes in the plurality of trees, based on correspondence between the nodes in the plurality of subtrees identified.

6. A non-transitory computer-readable recording medium storing therein an access classification program that causes a computer to execute a process comprising:
constructing a plurality of trees in each of which at least a first destination and a second destination are set as nodes which correspond to different websites, content information corresponding to the nodes is added to the nodes, and an automatic transfer instruction, which is a type of instruction from a plurality of different predetermined types of instructions, to transfer an access from the first destination to the second destination, is set as an edge which connects the nodes within the respective tree;
associating nodes of the plurality of trees with each other for the plurality of trees constructed at the constructing, based on similarity between local structures of the trees;
calculating similarity between the nodes associated with each other in the plurality of trees, based on the content information added to the nodes, and calculating similarity between the plurality of trees using the calculated similarity between the nodes associated with each other; and
classifying the access into a set with similar features, based on the similarity calculated at the calculating,
wherein the process further includes:
extracting subtrees from each of the plurality of trees constructed, and
initially identifying a plurality of subtrees based only on the automatic transfer instructions which are set as the edges of the plurality of subtrees matching each other and independent of any features of each of nodes connected by the edges of the plurality of subtrees, among the subtrees extracted for the plurality of trees, and then determining correspondence between nodes in the plurality of trees, based on correspondence between the nodes in the plurality of subtrees identified.

7. The access classification device according to claim 1, wherein the plurality of different predetermined types of instructions includes at least one of a link by an iframe tag of an HTML tag, a link by a Script tag of an HTML tag, a link by an Applet tag of an HTML tag, a transfer by HTTP, and a link by an Object tag of an HTML tag.

* * * * *